(12) United States Patent
Nakajima et al.

(10) Patent No.: US 12,182,655 B2
(45) Date of Patent: Dec. 31, 2024

(54) PROCESS MANAGEMENT SYSTEM, METHOD AND INFORMATION PROCESSING APPARATUS

(71) Applicant: CANON KABUSHIKI KAISHA, Tokyo (JP)

(72) Inventors: Yuki Nakajima, Kanagawa (JP); Toshifumi Kitamura, Shizuoka (JP); Junna Takase, Shizuoka (JP); Yasuhiro Tomioka, Shizuoka (JP); Yasuhiro Shimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/449,101

(22) Filed: Aug. 14, 2023

(65) Prior Publication Data
US 2024/0054301 A1 Feb. 15, 2024

(30) Foreign Application Priority Data
Aug. 15, 2022 (JP) .................. 2022-129380

(51) Int. Cl.
*G06K 7/10* (2006.01)
*G06K 19/077* (2006.01)

(52) U.S. Cl.
CPC ... *G06K 7/10366* (2013.01); *G06K 19/07758* (2013.01)

(58) Field of Classification Search
CPC ......... G06K 19/07758; G06K 7/10009; G06K 7/10366
See application file for complete search history.

(56) References Cited

U.S. PATENT DOCUMENTS

| 9,472,075 B1 | 10/2016 | Simon et al. |
| 11,237,568 B2 | 2/2022 | Nakashima et al. |

(Continued)

FOREIGN PATENT DOCUMENTS

| JP | 2005314886 A | 11/2005 |
| JP | 2007271347 A | 10/2007 |

(Continued)

OTHER PUBLICATIONS

Nakajima. Copending U.S. Appl. No. 18/449,040, filed Aug. 14, 2023.

(Continued)

*Primary Examiner* — Laura A Gudorf
(74) *Attorney, Agent, or Firm* — ROSSI, KIMMS & McDOWELL LLP

(57) ABSTRACT

A process management system includes a management unit that manages section data that defines sections in a real space and process data that indicates an expected location, from among the sections, in which a management target is to be positioned at the time of completing a work process, a first wireless device that is attached to the management target and stores first identification information, at least one reading apparatus that is capable of reading identification information from a wireless device, and a determination unit that checks a location of the management target estimated based on a result of reading of the first identification information from the first wireless device against the expected location by variable granularity depending on type information associated with the management target to determine a status of the work process regarding the management target.

7 Claims, 22 Drawing Sheets

(56) References Cited

U.S. PATENT DOCUMENTS

| | | | |
|---|---|---|---|
| 2014/0320265 A1* | 10/2014 | Jones | G06Q 10/087 340/10.1 |
| 2016/0110676 A1* | 4/2016 | Jones | G06Q 10/063114 340/10.1 |
| 2018/0282063 A1* | 10/2018 | Ueda | B65G 1/1373 |
| 2018/0293535 A1 | 10/2018 | Christopher | |
| 2020/0400458 A1 | 12/2020 | Semnani et al. | |
| 2020/0401861 A1 | 12/2020 | Akechi et al. | |
| 2021/0312147 A1 | 10/2021 | Nakajima | |
| 2022/0417895 A1 | 12/2022 | Shimura et al. | |
| 2023/0394257 A1* | 12/2023 | Andre | G06K 7/10366 |

FOREIGN PATENT DOCUMENTS

| | | |
|---|---|---|
| JP | 2014058403 A | 4/2014 |
| JP | 2018162149 A | 10/2018 |
| JP | 2020042419 A | 3/2020 |
| JP | 2020129312 A | 8/2020 |
| JP | 2021092833 A | 6/2021 |
| JP | 2021141415 A | 9/2021 |

OTHER PUBLICATIONS

Extended European Search Report issued in European Appln. No. 23191251.0, mailed Jan. 19, 2024.
Extended European Search Report issued in European Appln. No. 23191252.8 mailed Nov. 30, 2023.

* cited by examiner

FIG. 5

| TAG ID | TARGET ID | NAME | TARGET TYPE | LOCATED SECTION | COORDINATES |
|---|---|---|---|---|---|
| TG011 | IT11 | MATERIAL A1 | T1 | AA21 | (u, v, h) |
| TG012 | IT12 | MATERIAL A2 | T1 | AA21 | (u, v, h) |
| TG021 | IT21 | MATERIAL B1 | T2 | A000 | (u, v, h) |
| TG022 | IT22 | MATERIAL B2 | T2 | A000 | (u, v, h) |
| TG031 | IT31 | EQUIPMENT C1 | T3 | A000 | (u, v, h) |
| : | : | : | : | : | : |
| TG091 | UR91 | WORKER Z1 | T9 | AA10 | (u, v, h) |
| : | : | : | : | : | : |

FIG. 6

| SECTION ID | NAME | PARENT SECTION | LEVEL | MAP IMAGE | SCALE | ORIENTATION |
|---|---|---|---|---|---|---|
| A000 | SITE A | — | 1 | IMA0 | xxx | yyy |
| AA00 | BUILDING A | A000 | 2 | — | — | — |
| AA10 | FLOOR A1 | AA00 | 3 | IMA1 | xxx | yyy |
| AA20 | FLOOR A2 | AA00 | 3 | IMA2 | xxx | yyy |
| AA21 | ROOM A2-1 | AA20 | 4 | — | — | — |
| AA22 | ROOM A2-2 | AA20 | 4 | — | — | — |
| : | : | : | : | : | : | : |
| B000 | SITE B | — | 1 | IMB0 | xxx | yyy |
| : | : | : | : | : | : | : |

FIG. 7A

| TAG ID | INSTALLATION SECTION | TAG POSITION |
|---|---|---|
| TG500 | A000 | (U, V, H) |
| TG511 | AA10 | (U, V, H) |
| TG512 | AA10 | (U, V, H) |
| TG513 | AA10 | (U, V, H) |
| TG514 | AA20 | (U, V, H) |
| TG515 | AA21 | (U, V, H) |
| TG516 | AA22 | (U, V, H) |
| : | : | : |
| TG600 | B000 | (U, V, H) |
| : | : | : |

FIG. 7B

| READER ID | NAME | USER |
|---|---|---|
| RD01 | READER A | UR91 |
| RD02 | READER B | UR92 |
| : | : | : |

| 351 | 352 | 353 | 354 | 355 | 356 | 357 | 358 | 359 |
|---|---|---|---|---|---|---|---|---|
| WORK ID | PLACE | PROCESS ID | DEADLINE | TARGET | EXPECTED LOCATION | PROCESS STATUS | DATE OF COMPLETION | SUPPLEMENTARY STATUS |
| P1 | A000 | P11 | D11 | IT11 | AA00 | COMPLETED | D11 | YES |
|  |  |  |  | IT12 | AA00 | COMPLETED | D11 | YES |
|  |  |  |  | IT21 | AA00 | COMPLETED | D11 | — |
|  |  | : | : | : | : | : | : | : |
|  |  | P15 | D15 | IT11 | AA21 | NOT_COMPLETED | — | — |
|  |  |  |  | IT12 | AA22 | NOT_COMPLETED | — | — |
|  |  | : | : | : | : | : | : | : |
|  |  | P19 | D19 | IT11 | (u5, v5, h5) | NOT_COMPLETED | — | — |
|  |  | : | : | : | : | : | : | : |
| P2 | A000 |  |  |  |  |  |  |  |

FIG. 13A

| TARGET TYPE (381) | TYPE NAME (383) | MATCHING LEVEL (385) |
|---|---|---|
| T1 | MATERIAL A | 2 |
| T2 | MATERIAL B | 2 |
| T3 | EQUIPMENT | 3 |
| : | : | : |

| PROCESS TYPE (382) | TYPE NAME (384) | MATCHING LEVEL (385) |
|---|---|---|
| Px1 | CARRY-IN | 2 |
| Px2 | FLOOR DISTRIBUTION | 3 |
| : | : | : |
| Px9 | INSTALLATION | 4 |

| TARGET TYPE (381) | PROCESS TYPE (382) | MATCHING LEVEL (385) |
|---|---|---|
| T1 | Px1 | 2 |
| T1 | Px2 | 2 |
| T1 | : | : |
| T2 | Px1 | 3 |
| T2 | Px2 | 4 |
| T2 | : | : |
| : | : | : |

380c

PROCESS MANAGEMENT SYSTEM, METHOD AND INFORMATION PROCESSING APPARATUS

BACKGROUND OF THE INVENTION

Field of the Invention

The present disclosure relates to a process management system, a method and an information processing apparatus.

Description of the Related Art

Radio frequency identification (RFID) is a technology that allows information embedded in a small device which is also referred to as a tag to be read by an external reader through a short-range wireless communication. For example, an RFID tag in which unique identification information is embedded is attached to an item so that a location of the item can be efficiently recognized and that visualization of information on managed items can be facilitated. Among others, a passive type RFID tag, which transmits information utilizing energy of electromagnetic wave emitted from a reader, does not require a battery and thus is low-cost in manufacturing, and can operate semi-permanently. Hence, it has become widely-used in various scenes.

Japanese Patent Laid-Open No. 2020-129312 discloses a management system which makes use of RFID for making progress management of construction work efficient. In the management system of Japanese Patent Laid-Open No. 2020-129312, RFID tags are installed at specific places and also attached to building materials. In such a situation, latest locations and statuses of the building materials are presented to a user based on information read from the RFID tags by a handy terminal.

Japanese Patent Laid-Open No. 2021-141415 discloses a technology that combines information reading from RFID tags with a self-localization technique in order to estimate a position of a management target without relying on global positioning system (GPS) positioning which is likely to become unstable in an environment with a lot of blocking objects. According to the technology of Japanese Patent Laid-Open No. 2021-141415, a location of a management target is estimated based on a known position of a position tag installed in a fixed manner and an amount of relative movement of a reading apparatus calculated in accordance with the self-localization (also referred to as pedestrian dead reckoning (PDR)).

SUMMARY OF THE INVENTION

In the management system of Japanese Patent Laid-Open No. 2020-129312, a building material that should be in a predetermined place at a certain time point is determined to be in the right place if a handy terminal detects an RFID tag of the predetermined place as well as an RFID tag of the building material. However, a spatial granularity for location determination required in a general situation of process management is not always uniform. For example, it is enough for a type of building materials to arrive in a relatively large construction site whereas it may be required to deliver another type of building materials to a more specific point. Or even about the same type of building materials, they can be located in anywhere within a relatively large section in early ones of work processes of a construction work whereas they may sometimes have to be installed at specific positions in later ones of the work processes of the construction work. The existing systems cannot flexibly deal with such requirements.

In light of the foregoing, the present invention aims at providing a mechanism of efficient and more flexible process management.

According to an aspect, there is provided a process management system including a management unit configured to manage section data that defines a plurality of sections set in a real space and process data that indicates an expected location, from among the plurality of sections, in which a management target is to be positioned at the time of completing a work process that involves a movement of the management target, a first wireless device that is attached to the management target and stores first identification information for identifying the management target, at least one reading apparatus that is capable of reading, from a wireless device, identification information stored in the wireless device, and a determination unit configured to check a location of the management target estimated based on a result of reading of the first identification information from the first wireless device by a first reading apparatus against the expected location to determine a status of the work process regarding the management target. The section data defines at least one first-level section set in the real space with first spatial granularity and at least one second-level section set in the at least one first-level section with second spatial granularity that is finer than the first spatial granularity. The determination unit is configured to check the location of the management target against the expected location by variable granularity depending on type information associated with the management target. A corresponding method and an information processing apparatus are also provided Further features of the present invention will become apparent from the following description of exemplary embodiments (with reference to the attached drawings).

BRIEF DESCRIPTION OF THE DRAWINGS

FIG. 5 is an explanatory diagram illustrating an example of a configuration of a target table according to an embodiment;

FIG. 6 is an explanatory diagram illustrating an example of a configuration of a section table according to an embodiment;

FIG. 7A is an explanatory diagram illustrating an example of a configuration of a position tag table according to an embodiment;

FIG. 7B is an explanatory diagram illustrating an example of a configuration of a reader table according to an embodiment;

FIG. 9 is an explanatory diagram illustrating an example of a configuration of a work process table according to an embodiment;

FIG. 13A is an explanatory diagram illustrating a first example of a configuration of a granularity control table according to an embodiment;

FIG. 13B is an explanatory diagram illustrating a second example of a configuration of a granularity control table according to an embodiment;

FIG. 13C is an explanatory diagram illustrating a third example of a configuration of a granularity control table according to an embodiment;

DESCRIPTION OF THE EMBODIMENTS

Figure 1:
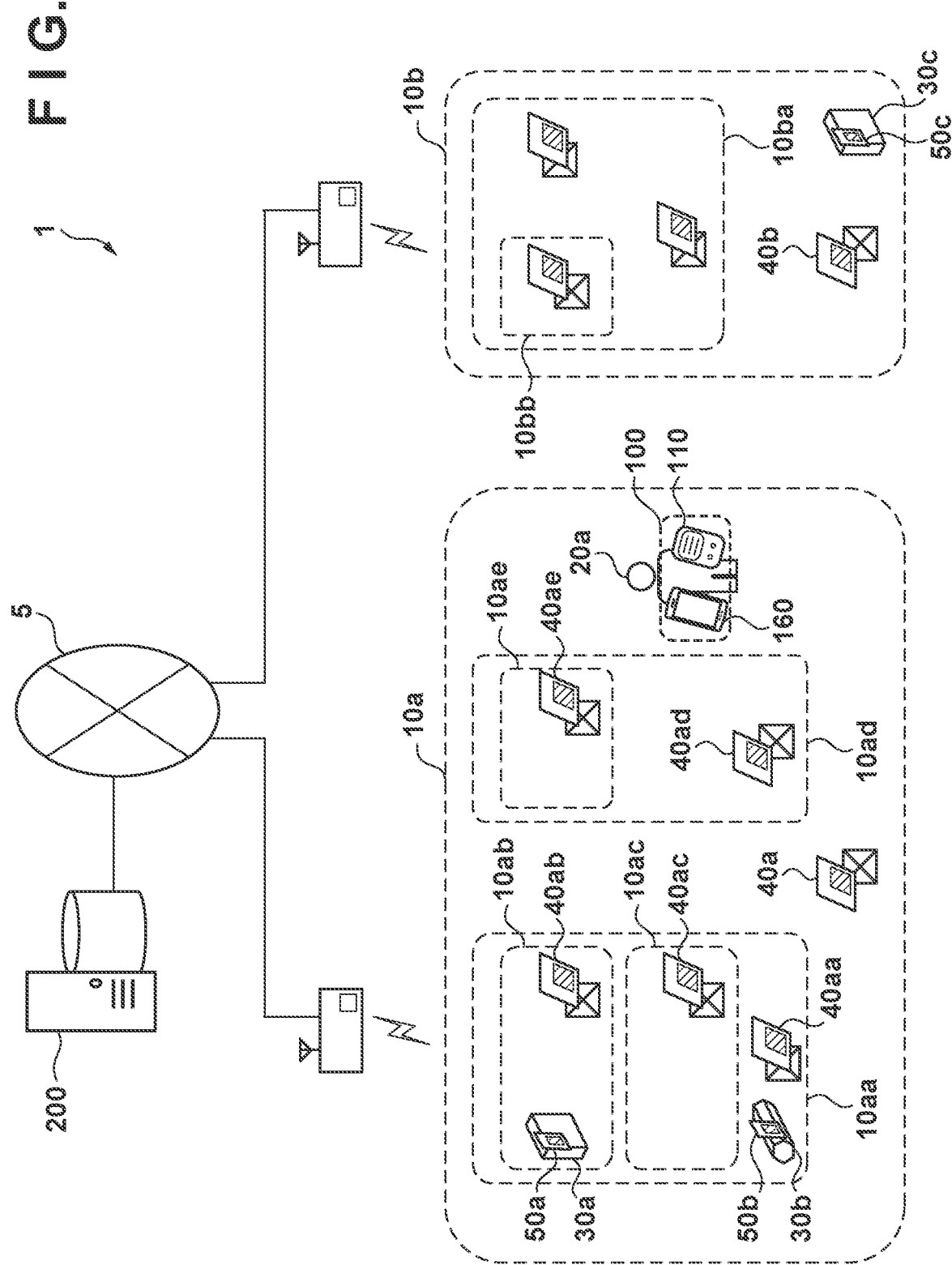
FIG. 1 is a schematic view illustrating an example of a configuration of a process management system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. System Overview

FIG. 1 is a schematic view illustrating an example of a configuration of a process management system 1 according to an embodiment. The process management system 1 is a system that tracks locations of management targets which may change day-to-day as a work advances, and assists visualization of information regarding work progress. The work treated in this Specification consists of one or more work processes, and at least one work process involves movement of a management target. In the following descriptions, a real space in which a work is carried out is also referred to as a work space. As an example, a work of constructing a building may include a sequence of work processes such as bringing materials to a site, distributing materials to floors or rooms, and installing materials. Management targets may include at least one of items that are located in the real space and users that act in the real space. An item may be a non-living object (for example, a machine, equipment, a tool, a material, a consumable good, a component, a vehicle, or a robot) or a living object (for example, an animal or a plant). In the following, an example of a work of constructing buildings is mainly described, however, the technology according to the present disclosure is also applicable to other types of works such as road construction or setting up of an event venue, for example.

In the present embodiment, the process management system 1 manages position information that indicates a location of each management target. For the management of the position information, it is assumed that a plurality of sections are set in a real space, and the sections will be candidate locations of each management target. The position information of each management target further includes two-dimensional or three-dimensional positional coordinates of a point where each management target is estimated to be located.

FIG. 1 is a schematic view illustrating an example of a configuration of the process management system 1 according to the present embodiment. In the example of FIG. 1, a plurality of sections 10a, 10aa, 10ab, 10ac, 10ad, 10ae, 10b, 10ba, and 10bb are set in the real space. For example, the sections 10a and 10b may correspond to geographically mutually-separated sites (for example, different construction sites). The sections 10aa and 10ad are sections set inside the section 10a with a finer spatial granularity than the spatial granularity of the section 10a, and may correspond to separate buildings constructed in a certain site, for example. The sections 10ab and 10ac are sections set inside the section 10aa with a finer spatial granularity than the spatial granularity of the section 10aa, and may correspond to separate floors that constitutes a certain building, for example. Similarly, the section 10ae is a section set inside the section 10ad with a finer spatial granularity than the spatial granularity of the section 10ad. Further sections that may correspond to rooms may be set in each floor with an even finer spatial granularity though they are not shown in FIG. 1. In this way, the plurality of sections set in a work space have tree-shaped hierarchical relationship, which is defined by the section data described below. In the following descriptions, a section set with relatively coarser spatial granularity is referred to as a higher-level section, and a section set with relatively finer spatial granularity is referred to as a lower-level section. For example, the sections 10aa, 10ab, 10ac, 10ad, and 10ae are lower-level sections with respect to the section 10a.

In the example of FIG. 1, the user 20a carries the portable system 100 with him or her while moving among the plurality of sections. Note that, in this specification, the expression that a user carries a certain target should broadly comprehend various modes in which the user moves together with the target (for example, moves in a state where he or she holds or wears the target, etc.). Furthermore, there are items 30*a*, 30*b* and 30*c* which exist in the section 10*ab*, 10*aa*, and 10*b*, respectively. These items are subject to the management of the position information by the process management system 1. In addition to the items, users (for example, workers, supervisors, and other related persons) may be management targets as well.

The process management system 1 makes use of wireless devices, which are also referred to as tags, in order to track locations of the management targets. A position tag is a wireless device (a second wireless device) which is installed in each of the sections that are possible locations of the management targets in the process management system 1. In the figure, there is a position tag 40*a* installed in the section 10*a*, a position tag 40*aa* in the section 10*aa*, a position tag 40*ab* in the section 10*ab*, a position tag 40*ac* in the section 10*ac*, a position tag 40*ad* in the section 10*ad*, and a position tag 40*ae* in the section 10*ae*. Similarly, there is a position tag 40*b* installed in the section 10*b*. Two or more position tags may be installed in one section and, in the example of FIG. 1, there are two position tags installed in the section 10*ba*. Each position tag has identification information (second identification information) associated with a corresponding installation location stored in an internal memory.

A target tag is a wireless devices (a first wireless device) which is attached to each of the management targets in the process management system 1. FIG. 1 shows a target tag 50*a* attached to the item 30*a*, a target tag 50*b* attached to the item 30*b*, and a target tag 50*c* attached to the item 30*c*. Each target tag has identification information (first identification information) stored in an internal memory for identifying the management target to which the target tag is attached.

Note that, in the following descriptions, the sections 10*a* to 10*bb* are collectively referred to as sections 10 by omitting the trailing alphabets from the reference signs when they do not need to be distinguished from each other. The same applies to the items 30 (items 30*a*, 30*b*, . . . ), the position tags 40 (position tags 40*a*, 40*b*, . . . ), the target tags 50 (target tags 50*a*, 50*b*, . . . ), and the user 20, as well as any other elements.

The number of sections set in a real space, and the number of management targets are not limited to the example illustrated in FIG. 1 but may be any numbers. Similarly, the number of users who utilize the process management system 1, and the number of portable systems 100 described below carried by users may also be any numbers. Moreover, the number of levels in the hierarchical relationship of the multiple sections may be at least two. Some instances of sets of levels are listed as follows for the cases where the number of levels are two, three, four or five. Note that each parenthesized list is one set of levels, and rightward levels in the list are lower levels:

Number of levels=2: (site, building), (building, floor), (building, room), (floor, room)
Number of levels=3: (site, building, floor), (site, building, room), (building, floor, room)
Number of levels=4: (site, building, floor, room), (organization, building, floor, room)
Number of levels=5: (organization, site, building, floor, room)

In the present embodiment, each of the tags such as the position tags 40 and the target tags 50 is assumed to be a passive-type RFID tag (a passive tag). A passive tag is composed of: a small integrated circuit (IC) chip with an embedded memory; and an antenna, and has specific identification information for identifying the tag and some other information stored in the memory. In this specification, identification information is simply referred to as an ID, and identification information for identifying a tag is referred to as a tag ID. It should be noted that the tag ID may be considered as information for identifying an object to which the tag is attached. The IC chip of a passive tag operates by utilizing energy of an electromagnetic wave emitted from a tag reader, and modulates the information such as the tag ID and some other information stored in the memory into an information signal to transmit (send back) the information signal from the antenna.

It should be noted that, in another embodiment, each tag may be an active-type RFID tag. If each tag actively (for example, periodically) transmits information to its vicinity by utilizing power from a built-in battery, such a tag may be called a beacon tag. In a further embodiment, each tag may be a wireless device which sends back information in response to a signal from a reader in accordance with Near Field Communication (NFC) protocol or Bluetooth (registered trademark) protocol, for example. Each tag may have any name such as an IC tag, an IC card, or a responder.

The process management system 1 includes a portable system 100 and a management server 200. The portable system 100 and the management server 200 are connected to a network 5. The network 5 may be a wired network, a wireless network, or any combination thereof. Examples of the network 5 may include the Internet, an intranet, and a cloud network.

The portable system 100 includes at least a tag reader 110. The tag reader 110 is a reading apparatus that is capable of reading information stored in wireless devices such as RFID tags. The tag reader 110 can detect a management target to which a target tag 50 is attached by reading a tag ID from the target tag 50, for example. The tag reader 110 attempts reading operation periodically or in response to a certain trigger such as a user operation, and transmits a tag reading result to the management server 200. The tag reader 110 may be capable of communicating with the management server 200 directly or indirectly via a certain relay apparatus (for example, a user terminal 160 described below). An example of a particular configuration of the tag reader 110 will be further described below.

In the example illustrated in FIG. 1, the portable system 100 further includes the user terminal 160. The user terminal 160 may be any type of terminal apparatus or an information processing apparatus such as a personal computer (PC), a tablet PC, a smart phone, or a smart watch, for example. The user terminal 160 may be utilized for the process management system 1 to interact with a user. An example of a particular configuration of the user terminal 160 will be further described below.

The management server 200 is an information processing apparatus that manages position information of management targets, statuses regarding work progress, and other information in a database. The management server 200 may be implemented as an application server, a database server, or a cloud server by using a high-end general-purpose computer, for example. The management server 200 receives tag reading results from the tag reader 110, and updates the database based on the received tag reading results. When updating a status of each management target, the management server 200 checks a location of each management target estimated based on the tag reading results against an expected location of the management target in each work process. An example of a particular configuration of the management server 200 will be further described below.

Though a single management server 200 is illustrated in FIG. 1, the functions of the management server 200, which will be described in detail below, may be provided by a single apparatus or by physically-separate multiple apparatuses which operate in conjunction with each other. In addition, though an example where the management server 200 retains a database will be described in the present embodiment, an apparatus other than the management server 200 may retain a part or all of the database. For example, a part of data may be retained by a wireless device (for example, a position tag or a target tag), the tag reader 110 or the user terminal 160.

Note that FIG. 1 shows an example where the portable system 100 includes separate apparatuses, namely the tag reader 110 and the user terminal 160. However, the portable system 100 is not limited to this example. For instance, the tag reader 110 may have a part or all of the functions of the user terminal 160 described below, or the user terminal 160 may have a part or all of the functions of the tag reader 110 described below. Moreover, the functions of the management server 200 described in the present embodiment may be realized within the user terminal 160.

2. Configuration Example of Portable System

<2-1. Configuration Example of Tag Reader>

Figure 2:
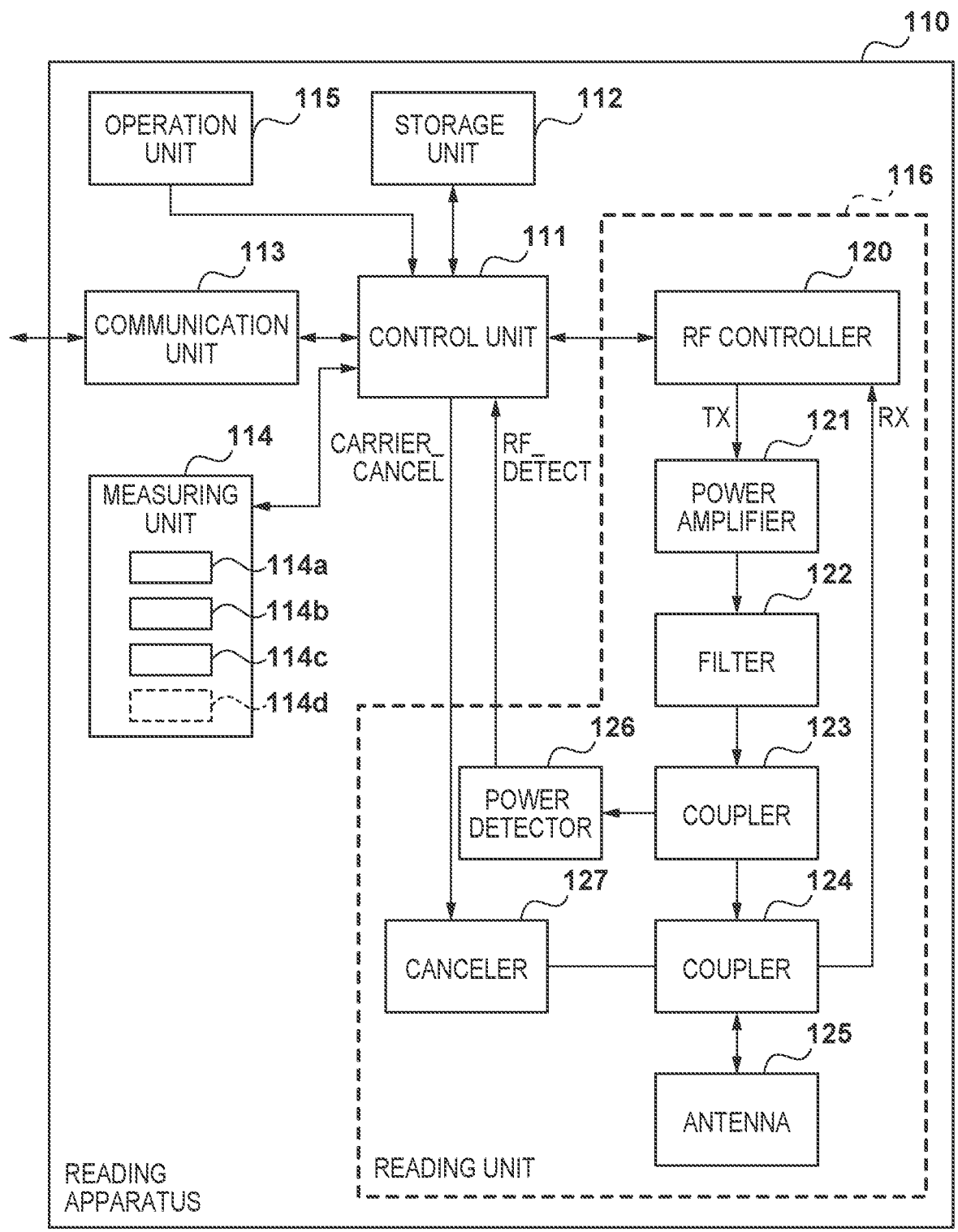
FIG. 2 is a block diagram illustrating an example of a configuration of a tag reader included in a portable system according to an embodiment.

FIG. 2 is a block diagram illustrating an example of a configuration of the tag reader 110 included in the portable system 100 according to an embodiment. With reference to FIG. 2, the tag reader 110 comprises a control unit 111, a storage unit 112, a communication unit 113, a measuring unit 114, an operation unit 115, and a reading unit 116.

The control unit 111 consists of a memory to store computer programs, and one or more processors (for example, central processing units (CPUs)) to execute the computer programs. The control unit 111 controls overall functionality of the tag reader 110 described in this specification. For example, the control unit 111 causes the reading unit 116 to perform reading from an RFID tag within a tag reading range, and causes the storage unit 112 to temporarily store the read information, the time of the reading and the received signal level as reading result data. In parallel to the reading from RFID tags, the control unit 111 also causes the measuring unit 114 to measure the position of the tag reader 110, and the storage unit 112 to store a measurement result. Then, the control unit 111 transmits, to the management server 200 via the communication unit 113, the reading result data and the measurement result data stored in the storage unit 112 together with the reader identification information (also referred to as a reader ID) of the tag reader 110.

The storage unit 112 may include any kind of storage medium such as a semiconductor memory (e.g. a read only memory (ROM), a random access memory (RAM), and the like), an optical disk, or a magnetic disk, for example. In the present embodiment, the storage unit 112 stores the above-described reading result data, measurement result data, and the reader ID of the tag reader 110.

The communication unit 113 is a communication interface for the tag reader 110 to communicate with the management server 200. For example, the communication unit 113 may be a wireless local area network (WLAN) interface that communicates with a WLAN access point, or a cellular communication interface that communicates with a cellular base station. Alternatively, the communication unit 113 may be a connection interface (e.g. a Bluetooth (registered trademark) interface or a universal serial bus (USB) interface) for connection with a relay apparatus.

The measuring unit 114 is a unit that is capable of measuring a position of the tag reader 110. In the present embodiment, the measuring unit 114 uses the self-localization, also referred to as PDR, to measure an amount of relative movement of the tag reader 110 from a certain reference position, and outputs the measured amount of movement to the control unit 111. The reference position of measurement of the amount of relative movement may be, for example, the position of the tag reader 110 at the time of being activated. The amount of relative movement of the tag reader 110 may be treated as a relative position. For example, the measuring unit 114 includes three-axis acceleration sensor 114a, gyro sensor 114b, and geomagnetic sensor 114c. The three-axis acceleration sensor 114a measures acceleration applied to the tag reader 110 in the device coordinate system that is specific to the tag reader 110, and outputs first sensor data. The gyro sensor 114b measures an angular speed of the tag reader 110, that is a change in attitude of the tag reader, and outputs second sensor data. The geomagnetic sensor 114c measures an orientation of the tag reader 110 in the real space, and outputs third sensor data. The measuring unit 114 can measure the amount of relative movement of the tag reader 110 based on these pieces of sensor data by converting the direction of the acceleration of the tag reader 110 into a direction in a coordinate system of the real space to integrate the converted acceleration. The amount of relative movement of the tag reader 110 output from the measuring unit 114 to the control unit 111 may be a two-dimensional vector in a horizontal plane or a three-dimensional vector that includes a component of height direction as well.

As described below, in the present embodiment, the positional coordinates of the installation position of each position tag 40 is known and registered in a database. Therefore, the positional coordinates of the point at which the tag reader 110 is currently positioned can be estimated based on the amount of relative movement of the tag reader 110 from the time point where it detected a position tag 40 to the current time point, and the known positional coordinates of that position tag 40. In the present embodiment, an example where the management server 200 estimates an absolute position of the tag reader 110 is mainly described, however, the control unit 111 or the measuring unit 114 of the tag reader 110 may access the database to estimate the absolute position of the tag reader 110.

Note that the portable system 100 may include a measuring apparatus (which is capable of measuring an amount of relative movement using the self-localization, for example) separately from the tag reader 110, instead of the tag reader 110 including the measuring unit 114.

In an alteration example, the measuring unit 114 may further include an air pressure sensor 114d indicated by a dashed line in FIG. 2. The air pressure sensor 114d measures the atmospheric pressure, and outputs air pressure data indicating the measured value to the control unit 111. In this alteration example, the air pressure data output from the air pressure sensor 114d may be utilized for estimating the height of the point at which the tag reader 110 is currently positioned. For example, with a linear air pressure to height model, a relative height of a current position from a reference position can be derived by multiplying an amount of descent of the air pressure value at the current position from the air pressure value at the reference point by a predetermined coefficient. In a case where the reference point is set up on the ground, the relative height represents an altitude of the current position above the ground. An air pressure sensor to measure the atmospheric pressure at the reference point may be additionally deployed.

The operation unit 115 receives an operation by the user 20. The operation unit 115 includes physical input devices such as a button, a switch, or a lever disposed on a housing of the tag reader 110, for example. The operation unit 115 receives an operation by the user 20 through an input device, and outputs an operation signal to the control unit 111. In addition, the operation unit 115 may include an audio input interface such as a microphone.

The reading unit 116 is a unit that is capable of reading, from each of the position tags 40 and the target tags 50 under management in the process management system 1, information stored in the tag. With reference to FIG. 2, the reading unit 116 includes an RF controller 120, a power amplifier 121, a filter 122, a first coupler 123, a second coupler 124, an antenna 125, a power detector 126, and a canceler 127. The RF controller 120 outputs a transmission signal (for example, a signal modulated in the UHF band) from a TX terminal to the power amplifier 121 in accordance with control by the control unit 111. The power amplifier 121 amplifies the transmission signal input from the RF controller 120 to output it to the filter 122. The amplification rate of the transmission signal here may be controllable in variable manner, and a higher amplification rate will enhance an output strength of an electromagnetic wave emitted from the tag reader 110. The filter 122 may be a low-pass filter, for example, and filters out unnecessary frequency components from the transmission signal amplified by the power amplifier 121. The first coupler 123 distributes the transmission signal that has passed the filter 122 to the second coupler 124 and the power detector 126. The second coupler 124 outputs the transmission signal input from the first coupler 123 to the antenna 125, and outputs a received signal input from the antenna 125 to the RF controller 120. The antenna 125 transmits the transmission signal input from the second coupler 124 to the air as an electromagnetic wave. Further, the antenna 125 receives a signal that has been sent back from an RFID tag that exists within the reading range of the tag reader 110 in response to the transmission signal, and outputs the received signal to the second coupler 124. The power detector 126 detects a power level of the signal input from the first coupler 123, and outputs a signal 'RF_DETECT' indicative of the detected power level to the control unit 111. The canceler 127 receives a signal 'CARRIER_CANCEL' indicative of a power level of a carrier from the control unit 111. Then, the canceler 127 extracts an intended signal component of the received signal to be output to an RX terminal of the RF controller 120 by canceling the carrier component of the transmission signal based on the CARRIER_CANCEL. The RF controller 120 demodulates the signal input from the RX terminal to obtain the tag ID and other information sent back from the RFID tag, and outputs the obtained information to the control unit 111. The RF controller 120 also measures a received level (also referred to as received strength) of the signal input from the RX terminal, and outputs the measurement result to the control unit 111.

In the present embodiment, the reading unit 116 can attempt tag reading periodically (for example, once per second) without requiring any explicit command from a user. Data transmission from the communication unit 113 to the management server 200 can also be performed periodically (for example, every few seconds) or whenever the tag reading is done without requiring any explicit command from a user. The control unit 111 may exclude, from the data to be transmitted, the same record as the most recent record that has already been transmitted in a predetermined time period to omit redundant data transmission and reduce a communication load. Noted that, in another embodiment, one or both of an attempt of tag reading by the reading unit 116 and data transmission to the management server 200 may be performed in response to detecting a user input via the operation unit 115. In a case where the communication unit 113 performs communication with the management server 200 indirectly via a relay apparatus, the data transmission to the management server 200 may be performed only while there is an effective connection between the communication unit 113 and the relay apparatus.

<2-2. Configuration Example of User Terminal>

Figure 3:
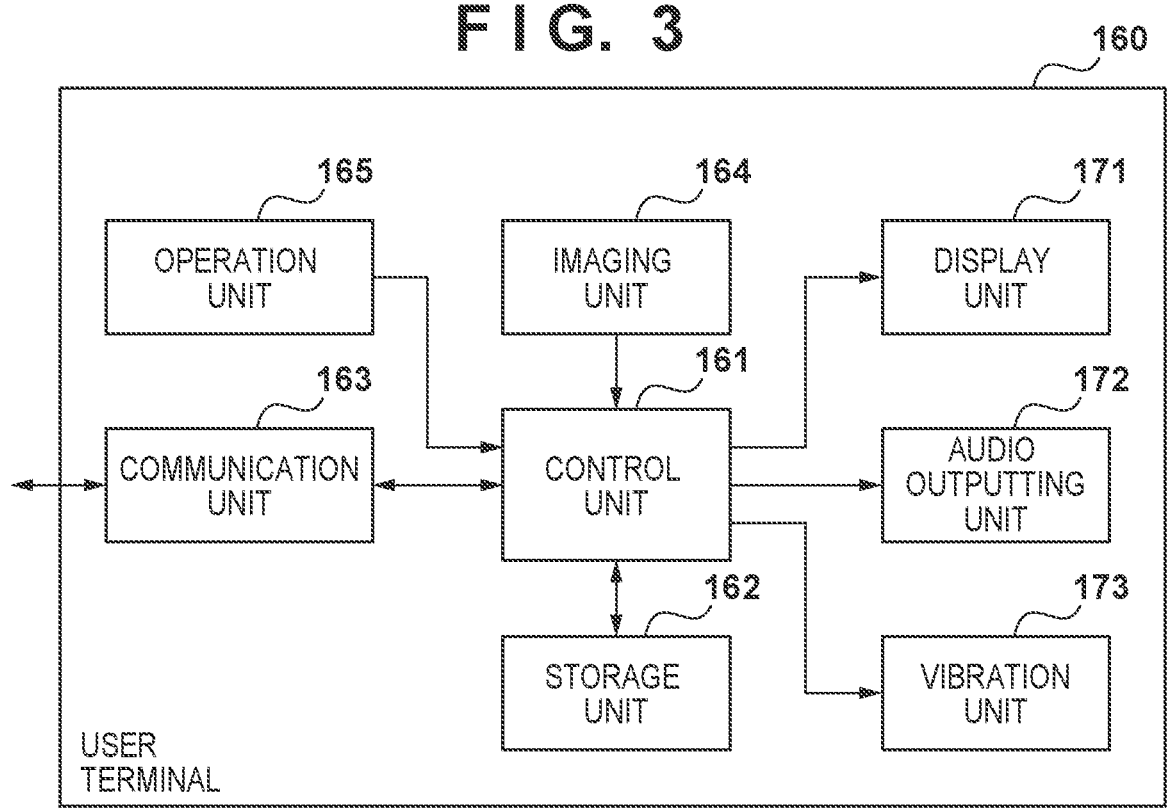
FIG. 3 is a block diagram illustrating an example of a configuration of a user terminal included in the portable system according to an embodiment.

FIG. 3 is a block diagram illustrating an example of a configuration of the user terminal 160 included in the portable system 100 according to an embodiment. With reference to FIG. 3, the user terminal 160 comprises a control unit 161, a storage unit 162, a communication unit 163, an imaging unit 164, an operation unit 165, a display unit 171, an audio outputting unit 172 and a vibration unit 173.

The control unit 161 consists of a memory to store computer programs, and one or more processors to execute the computer programs. The processor may be a CPU, or an integrated circuit (IC) such as a microcontroller (for example, one-chip microcontroller). The control unit 161 controls overall functionality of the user terminal 160 described in this specification. For example, when the user 20 desires to browse position information or a status of a management target in the process management system 1, the control unit 161 causes the display unit 171 to display a screen that presents the requested information. Some examples of screens displayed to the user 20 will further be described below.

The storage unit 162 may include any kind of storage medium such as a semiconductor memory (e.g. ROM, RAM, and the like), an optical disk, or a magnetic disk, for example. In the present embodiment, the storage unit 162 temporarily store map image and information regarding locations of management targets received from the management server 200 described below for the purpose of screen display, for example.

The communication unit 163 is a communication interface for the user terminal 160 to communicate with the management server 200. For example, the communication unit 163 may be a WLAN interface or a cellular communication interface. The user terminal 160 may further comprise a connection interface (e.g. a Bluetooth (registered trademark) interface or a universal serial bus (USB) interface) for connection with peripheral equipment though it is not shown in FIG. 3.

The imaging unit 164 is a so-called camera unit that images a scene of a real space to generate image data of a still image or a moving image. The imaging unit 164 outputs the generated image data to the control unit 161. For example, the image data generated by the imaging unit 164 may be utilized for optical character recognition (OCR) or reading a visible code such as a bar code or a QR code (registered trademark).

The operation unit 165 receives operations or information inputs from the user 20. The operation unit 165 includes input devices such as a touch sensor, a key pad, a key board, a button, or a pointing device, for example. The operation unit 165 receives an operation by the user 20 through an input device, and outputs an operation signal to the control unit 161. In addition, the operation unit 165 may further include some other types of input devices including an audio input interface such as a microphone, a sensor to detect a vibration, or the like.

The display unit 171 displays an image or information. The display unit 171 may be a liquid crystal display or an organic light emitting diode (OLED) display, for example. The audio outputting unit 172 outputs audio. The audio outputting unit 172 may be a speaker, for example. The vibration unit 173 vibrates the user terminal 160. The vibration unit 173 may be a vibrator including an eccentric motor, for example.

3. Configuration Example of Management Server

<3-1. Basic Configuration>

Figure 4:
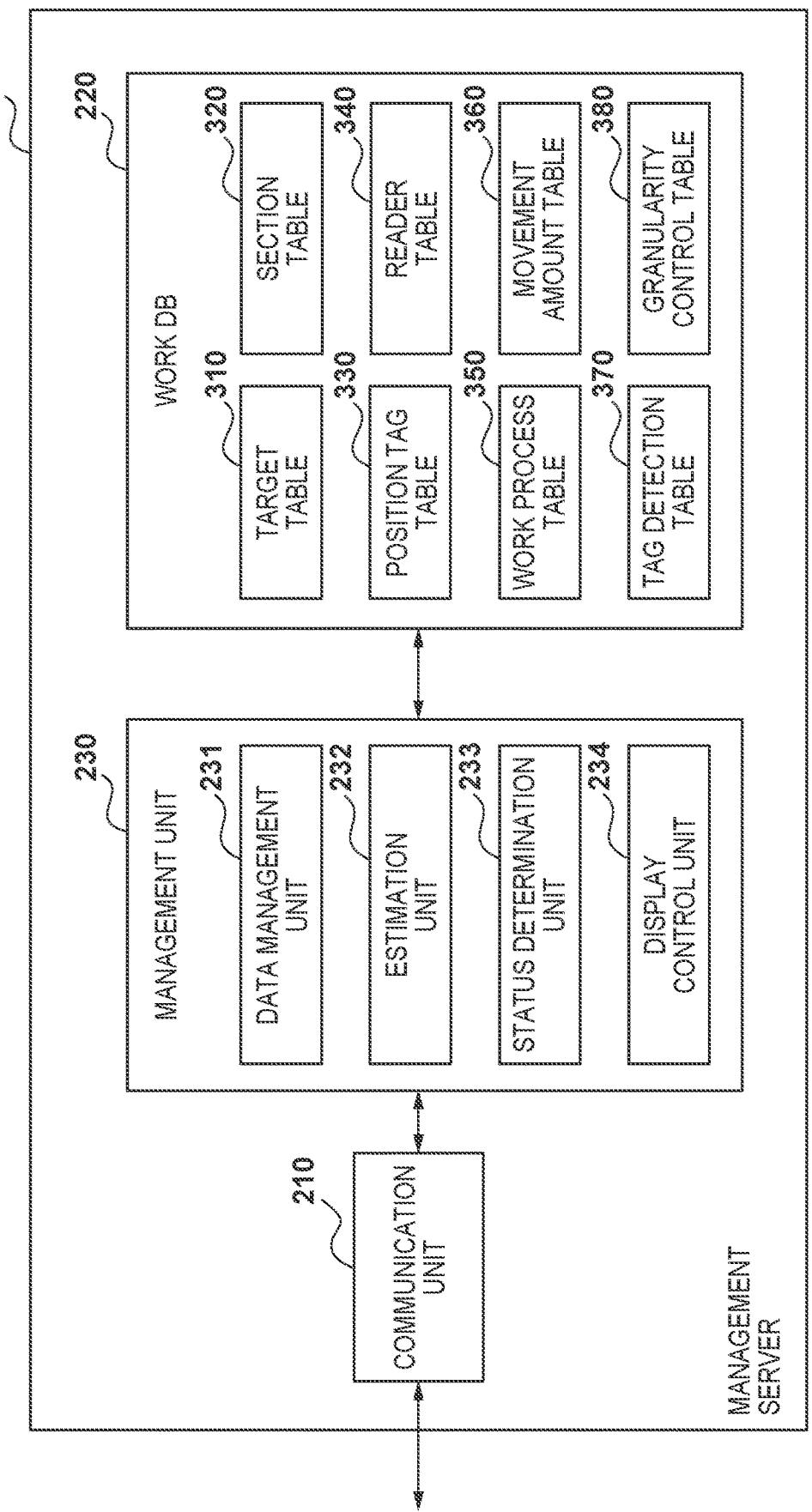
FIG. 4 is a block diagram illustrating an example of a configuration of a management server according to an embodiment.

FIG. 4 is a block diagram illustrating an example of a configuration of the management server 200 according to an embodiment. With reference to FIG. 4, the management server 200 comprises a communication unit 210, an work database (DB) 220, and a management unit 230.

The communication unit 210 is a communication interface for the management server 200 to communicate with other apparatuses. The communication unit 210 may be a wired communication interface or a wireless communication interface. In the present embodiment, the communication unit 210 communicates with the portable system 100 (for example, one or both of the tag reader 110 and the user terminal 160). The work DB 220 is a database that stores various data for estimation of positions of management targets and management of work progress and is accessible from the management unit 230. In the present embodiment, the work DB 220 includes a target table 310, a section table 320, a position tag table 330, a reader table 340, a work process table 350, a movement amount table 360, a tag detection table 370, and a granularity control table 380. The management unit 230 is a set of software modules that perform various processing related to position estimation and progress management. The individual software modules can run by one or more processors (not shown) of the management server 200 executing computer programs stored in a memory (not shown). In the present embodiment, the management unit 230 includes a data management unit 231, an estimation unit 232, a status determination unit 233, and a display control unit 234.

<3-2. Data Management>

(1) Target Table

FIG. 5 illustrates an example of a configuration of the target table 310 of the work DB 220. The target table 310 has six data elements of Tag ID 311, Target ID 312, Name 313, Target Type 314, Located Section 315, and Coordinates 316. Tag ID 311 is identification information that uniquely identifies a target tag 50 attached to each of the management targets. The value of Tag ID 311 is the same as the value of the tag ID stored within the corresponding target tag 50. Target ID 312 is identification information that uniquely identifies each management target. Name 313 represents a name of each of the management targets. In the example of FIG. 5, the management target identified by a target ID 'IT11' is given a name of 'Material A1'. Target Type 314 is a mode of type information associated with a management target. In the example of FIG. 5, 'Material A1' and 'Material A2' are classified as the same target type 'T1' whereas 'Material B1' is classified as a target type 'T2' that is different from the target type 'T1'. Located Section 315 identifies a located section in which each management target is estimated to be located from among the plurality of sections set in a workspace by a value of Section ID 321 of the section table 320 described below. In the example of FIG. 5, 'Material A1' and 'Material A2' are estimated to be located in a section identified by the section ID 'AA21' whereas 'Material B1' is estimated to be located in a section identified by the section ID 'A000'. Coordinates 316 represents positional coordinates of a point at which each management target is estimated to be positioned. In this specification, "location" of a management target means a position of the management target represented by a value/values of Located Section 315 or Coordinates 316. The values of Located Section 315 and Coordinates 316 may be updated by the estimation unit 232 when the tag reader 110 has detected a movement of a management target as will be described below.

(2) Section Table

Figure 8A:
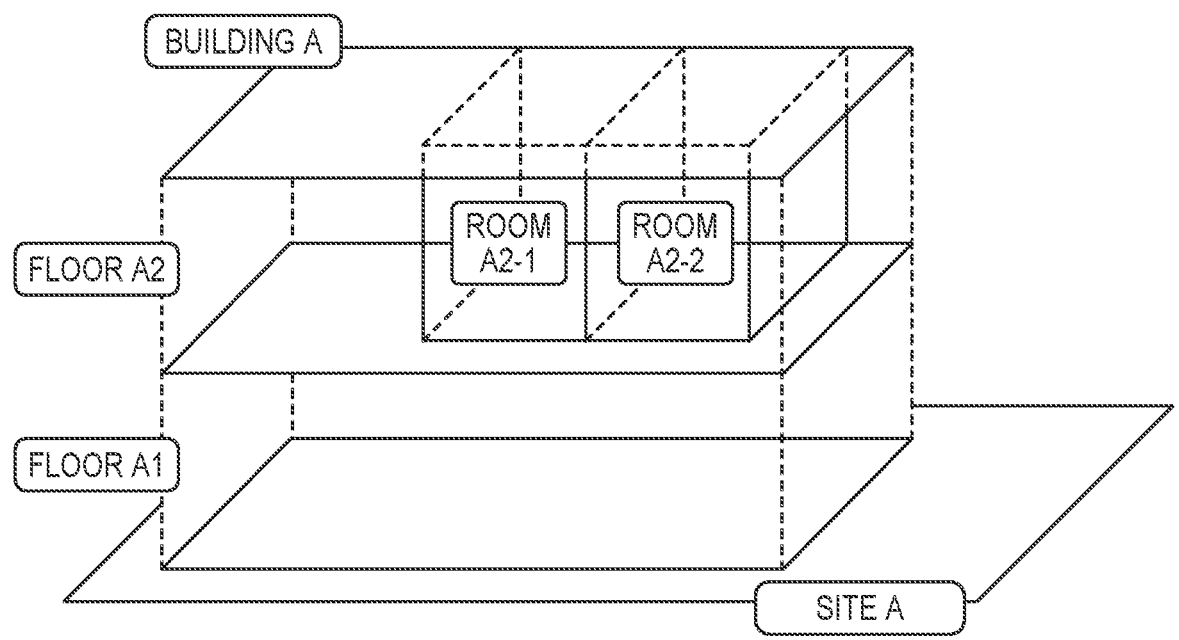
FIG. 8A is a schematic view schematically illustrating an example of section settings corresponding to the data example of FIG. 6.

FIG. 6 illustrates an example of a configuration of the section table 320 of the work DB 220. The section table 320 contains section data that defines a plurality of sections set in a work space. The section table 320 has seven data elements of Section ID 321, Name 322, Parent Section 323, Level 324, Map Image 325, Scale 326, and Orientation 327. Section ID 321 is identification information that uniquely identifies each of the plurality of sections. Name 322 represents a name of each section. In the example of FIG. 6, the section identified by a section ID 'A000' is given a name of 'Site A'. Parent Section 323 identifies the section that directly encompasses each section in the hierarchical relationship of the multiple sections set in the work space by a value of Section ID 321 of another record in the section table 320. In the example of FIG. 6, the parent section of the section identified by a section ID 'AA00' has a value of 'A000', which means that 'Building A' is encompassed by 'Site A'. In other words, 'Site A' is an immediate higher-level section of 'Building A'. Parent Section 323 may be blank for the topmost section in the hierarchical relationship of the multiple sections. Level 324 is a measure of spatial granularity of each section, and represents a depth of the section in the tree-shaped hierarchical relationship with respect to the topmost section. In the example of FIG. 6 where 'Site A' is the parent section of 'Building A', 'Building A' is the parent section of 'Floor A2', and 'Floor A2' is the parent section of 'Room A2-1', levels of 'Site A', 'Building A', 'Floor A2', and 'Room A2-1' are 1, 2, 3 and 4, respectively. Map Image 325 is a data element in which map image data is stored when the available map image data for each section is registered by a user. Scale 326 represents a ratio for converting a distance on the map of Map Image 325 into a distance in the real space (for example, how many meters in the real space one pixel of the image corresponds to). Orientation 327 is a data element in which orientation information indicating the orientation in the map of Map Image 325 is stored. For example, the orientation information may include a vector that points a specific direction (for example, north) in the two-dimensional coordinates of the map image data. FIG. 8A schematically illustrates an example of positional relationship between sections which belong to 'Site A' from among the sections defined by the section data illustrated in FIG. 6.

(3) Position Tag Table

FIG. 7A illustrates an example of a configuration of the position tag table 330 of the work DB 220. The position tag table 330 has three data elements of Tag ID 331, Installation Section 332, and Tag Position 333. Tag ID 331 is identification information that uniquely identifies each of the position tags 40 installed in the work space. The value of Tag ID 331 is the same as the value of the tag ID stored within the corresponding position tag 40. Installation Section 332 identifies the section in which each position tag 40 is installed by a value of Section ID 321 in the section table 320. That is, the tag ID of each position tag 40 is associated with an installation section corresponding to the position tag 40 in the position tag table 330. With reference to FIG. 7A, the tag ID 'TG500' is associated with the section ID 'A000', for example. This represents that the position tag 40 identified by the tag ID 'TG500' is installed in the section identified by the section ID 'A000'. Tag Position 333 represents the positional coordinates of the position at which each position tag 40 is installed.

Figure 8B:
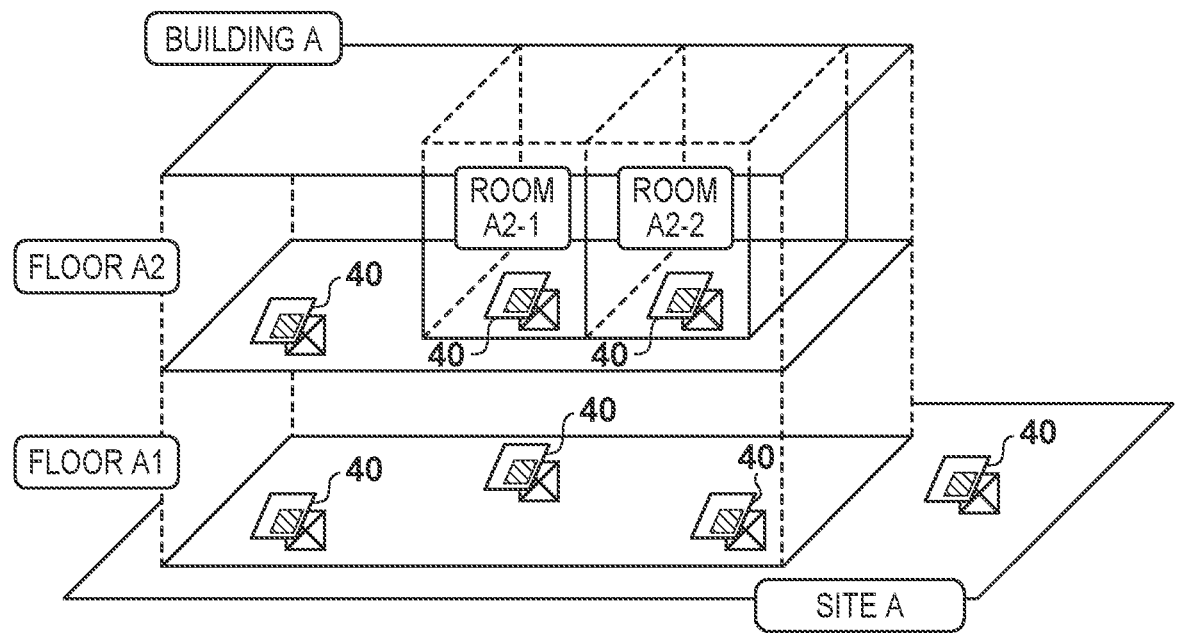
FIG. 8B is a schematic view schematically illustrating an example of position tag arrangement corresponding to the data example of FIG. 6 and FIG. 7A.

FIG. 8B schematically illustrates an example of an arrangement of position tags 40 corresponding to the data example of the position tag table 330 of FIG. 7A assuming the positional relationship of the sections illustrated in FIG. 8A. In buildings like the one illustrated in the figure, walls, floors and ceilings often block wireless signals. By having a position tag 40 installed in each of sections divided from one another by such blocking objects, it is possible to determine in which section the tag reader 110 is located at the time of tag detection based on which one of the position tags 40 the tag reader 110 has detected. The present embodiment combines such simple determination of a located section based on tag reading with finer position estimation using the self-localization technique described below. For a relatively large section, two or more position tags 40 may be set in a single section as with the case of 'Floor A1' of FIG. 8B because a detectable range of one position tag 40 sometimes does not cover a sufficient area.

(4) Reader Table

FIG. 7B illustrates an example of a configuration of the reader table 340. The reader table 340 has three data elements of Reader ID 341, Name 342, and User 343. Reader ID 341 is identification information that uniquely identifies each of the tag readers 110 utilized in the system. Name 342 represents a name of each reader. User 343 is identification information that identifies a user 20 who utilize each tag reader 110. In the example of FIG. 7B, the tag reader 110 identified by Reader ID 'RD01' has the name of 'Reader A' and is utilized by the user identified by the User ID 'UR91'.

(5) Work Process Table

FIG. 9 illustrates an example of a configuration of the work process table 350. The work process table 350 is a table that contains data regarding progress of work including at least one work process that involves movement of a management target. In the present embodiment, it is assumed that the work process table 350 includes data for each work process (also referred to as process data) that indicates an expected location in which a management target treated in each work is to be positioned at the time of completing each of work processes constituting the work. The work process table 350 has nine data elements of Work ID 351, Place 352, Process ID 353, Deadline 354, Target 355, Expected Location 356, Process Status 357, Date of Completion 358, and Supplementary Status 359. Work ID 351 is identification information for uniquely identifying each work. Place 352 identifies a place where each work is carried out by one value of Section ID 321 from among the sections set with the broadest spatial granularity in the section table 320. Process ID 353 is identification information for uniquely identifying each of work processes constituting each work. There is one or more work processes per one work. Deadline 354 represents a deadline for each work process to be completed. Target 355 identifies each of management targets treated in each work process by a value of Target ID 312 in the target table 310. One or more management targets may be treated in one work process. Expected Location 356 represents a location in which a management target identified by the value of Target 355 is to be positioned at the time of completion of each work process by a value of Section ID 321 in the section table 320 or positional coordinates. Process Status 357 represents a status regarding movement to the expected location of each management target in each work process. For example, Process Status 357 may be a binary flag that indicates whether movement to the expected location of each management target has been completed or not. The value of Process Status 357 may be updated by the status determination unit 233 as a result of checking a location of each management target against the expected location as will be described below. Date of Completion 358 represents the date on which it is determined that the movement to the expected location of each management target has been completed. Supplementary Status 359 represents a supplementary status for each management target in each work process that can be arbitrarily set by a user. As described below, Supplementary Status 359 may represent whether an acceptance inspection (for example, performed visually) to confirm that each management target actually exists in the expected location has been completed or not, for example. In this case, Supplementary Status 359 may be called Acceptance Status. In the example of FIG. 9, the work identified by the work ID 'P1' includes a plurality of work processes identified by the process IDs 'P11' to 'P19', respectively. In the work process identified by the process ID 'P11', the management targets identified by the target IDs 'IT11', 'IT12' and 'IT21' are scheduled to be moved to the section identified by the section ID 'AA00'. Since the values of Process Status 357 indicate 'Completed', one can know that the movement of these management targets has already been completed.

(6) Data Registration

The data management unit 231 manages various types of data stored in the work DB 220 such as those described above. The data to be registered in each table of the work DB 220 can be generated by, for example, a user or an engineer. The data management unit 231 may receive a data file containing such data via the communication unit 210 and register the data in the tables. The map image data for each section may be data based on a computer-aided design (CAD) drawing, for example. The data management unit 231 may provide a user interface (UI), for accepting the registration, modification, or deletion of data, to the user terminal 160, for example.

Figure 10:
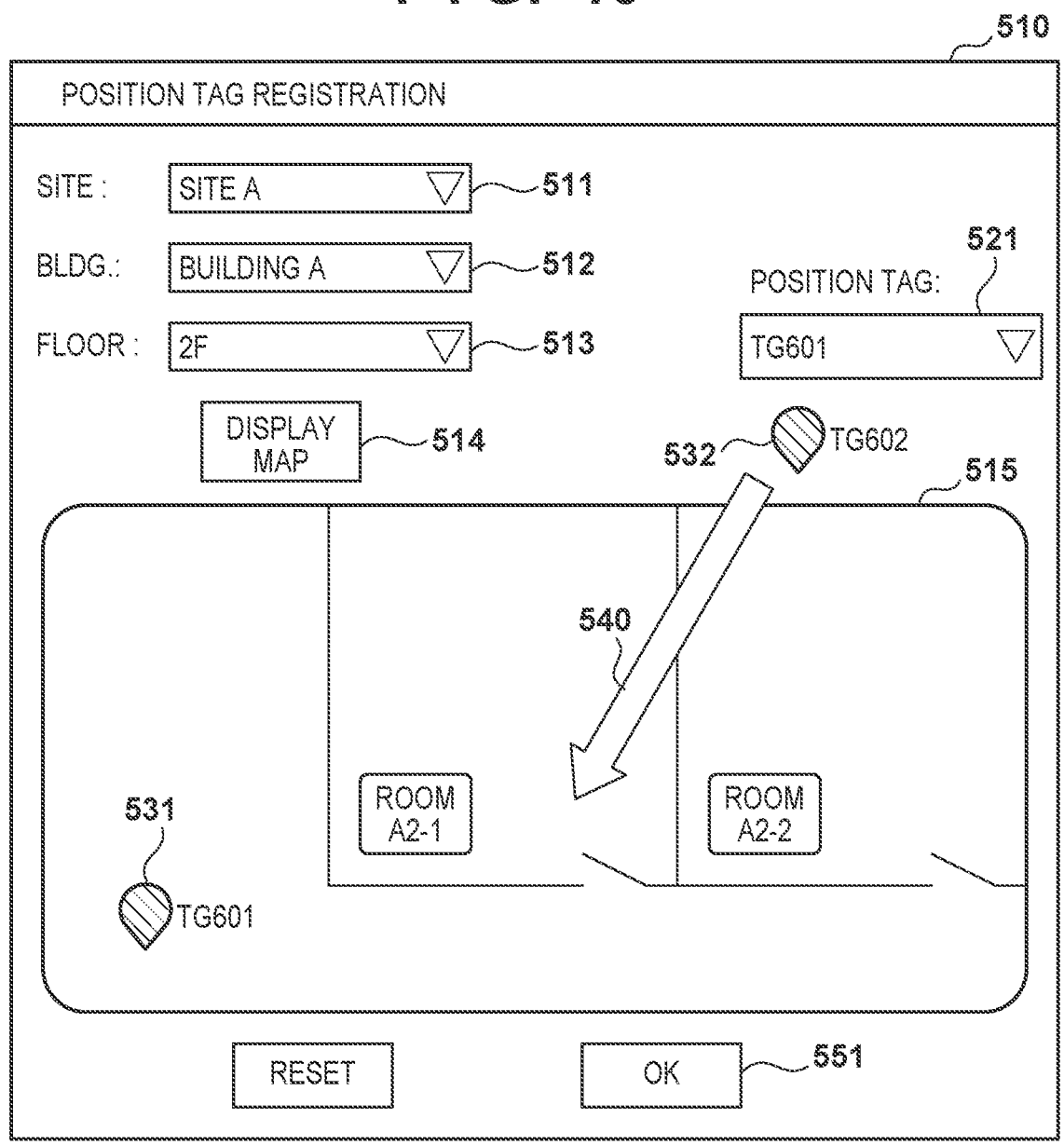
FIG. 10 is an explanatory diagram illustrating an example of a user interface (UI) that may be provided for registration of installation positions of position tags.

FIG. 10 is an explanatory diagram illustrating an example of a UI that can be provided for registering an installation position of a position tag. A position tag registration screen 510 illustrated in FIG. 10 is called, for example, when the user installs the position tag 40 at a point in the work space, and can be displayed by the display unit 171 of the user terminal 160. The position tag registration screen 510 includes a site selection field 511, a building selection field 512, a floor selection field 513, a map display button 514, and a map display area 515. When the user selects a site, a building, and a floor corresponding to the point where the position tag 40 is installed in the fields 511, 512, and 513, and manipulates (e.g., touches or clicks) the map display button 514, a map image of that floor is displayed in the map display area 515. The displayed map image indicates that the floor includes two rooms, and an icon 531 representing the installed and registered position tag 40 is superimposed on the map image. The position tag registration screen 510 further includes a position tag selection field 521 and a button 551. When the user selects the tag ID of a newlyinstalled position tag 40 in the position tag selection field 521, an icon 532 representing the selected position tag 40 is displayed in the vicinity of the map display area 515. The user specifies the installation position of the new position tag 40 by moving the icon 532 to the point where the position tag 40 has been installed (for example, by dragging and dropping) (see the arrow 540). When the user manipulates the button 551, registration information including the selected or specified tag ID and the installation position is transmitted from the user terminal 160 to the management server 200. The data management unit 231 can register a new record pertaining to the position tag 40 in the position tag table 330 based on the registration information received in this manner.

Figure 11:
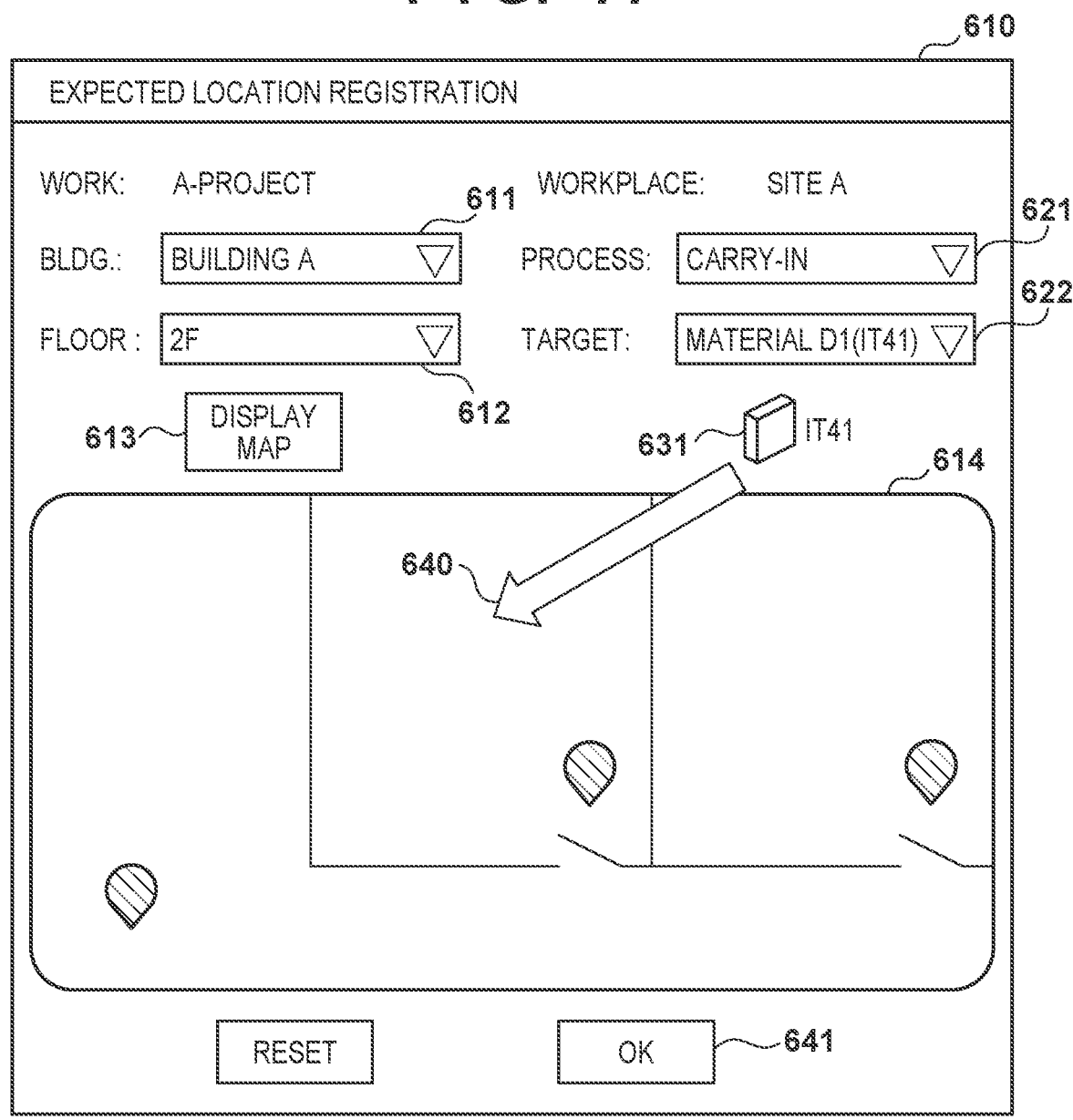
FIG. 11 is an explanatory diagram illustrating an example of a UI that may be provided for registration of expected locations of management targets for a certain work process.

FIG. 11 is an explanatory diagram illustrating an example of a UI that can be provided for registering an expected location of a management target in a certain work process. An expected location registration screen 610 illustrated in FIG. 11 is called when, for example, a work plan has been determined, and can be displayed by the display unit 171 of the user terminal 160. The expected location registration screen 610 includes a building selection field 611, a floor selection field 612, a map display button 613, and a map display area 614. When the user selects a building and a floor of the intended expected location in the fields 611 and 612 and manipulates the map display button 613, a map image of that floor is displayed in the map display area 614. The expected location registration screen 610 further includes a process selection field 621, a target selection field 622, and a button 641. When the user selects an intended work process in the process selection field 621, management targets handled in that work process are become selectable in the target selection field 622. When the intended management target is selected by the user in the target selection field 622, an icon 631 representing the selected management target is displayed in the vicinity of the map display area 614. By moving the icon 631 to the expected location to which the corresponding management target is to be moved, the user specifies the expected location of the management target in the selected work process (see the arrow 640). Then, when the user manipulates the button 641, registration information including the selected or specified target ID, work ID, process ID, and expected location is transmitted from the user terminal 160 to the management server 200. The data management unit 231 can register an expected location corresponding to each of combinations of work processes and management targets in a work process table 350 based on the registration information received in this manner.

The configurations of the databases managed by the management server 200 are not limited to the configurations described here. Two or more of the tables described above may be merged into a single table, or one of the tables described above may be divided into two or more tables. Each table may include additional data elements, or may not include one or more of the data elements described above.

For example, the target table 310 may include additional data elements, such as those for manufacturers and owners of items serving as management targets and for organizations to which users belong. Furthermore, the data elements described as being held in the work process table 350 may be merged into the target table 310. In this case, the target table 310 may have a pair of data elements indicating the expected location and the process status for each of the plurality of work processes. Rather than a plurality of data elements indicating respective statuses of a plurality of corresponding work processes, a single data element may be employed which selectively indicates one of a plurality of status values related to the plurality of work processes (e.g., "process A completed", "process B completed", and so on).

The section table 320 may also include a data element indicating the altitude of each floor. The section table 320 may also include a data element indicating the elevation of the ground surface of each site or each building. This altitude or elevation may be utilized, for example, when deriving the height of a point at which a certain management target is located from a measurement value of the air pressure.

<3-3. Location Estimation>

The estimation unit 232 estimates a location of a management target to which a target tag 50 is attached based on a result of reading a tag ID from the target tag 50 by a tag reader 110 (a first reading apparatus) and a result of reading a tag ID from a position tag 40 by the same tag reader 110. The movement amount table 360 and the tag detection table 370 of the work DB 220 are used for such location estimation.

(1) Movement Amount Table

Figure 12A:
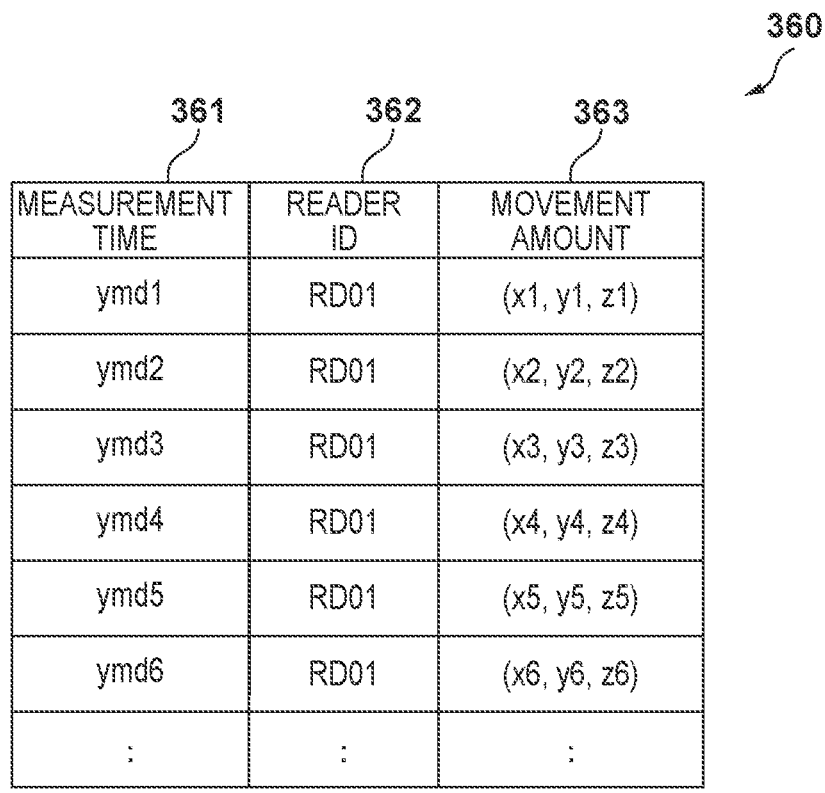
FIG. 12A is an explanatory diagram illustrating an example of a configuration of a movement amount table according to an embodiment.

FIG. 12A illustrates an example of a configuration of the movement amount table 360. The movement amount table 360 is a table for accumulating records of measurement result data received from tag readers 110 (herein after referred to as "measurement result records"). The movement amount table 360 has three data elements, namely Measurement Time 361, Reader ID 362, and Movement Amount 363. Measurement Time 361 indicates the time at which the measurement has been performed with respect to the measurement result indicated by each measurement result record. Reader ID 362 uses a value of Reader ID 341 in the reader table 340 to indicate the tag reader 110 that performed the measurement with respect to the measurement result indicated by each measurement result record. In the example in FIG. 12A, the six records in the movement amount table 360 indicate the results of the movement amount measurement performed by the tag reader 110 identified by a reader ID of "RD01" at six different times, namely "ymd1" to "ymd6". Movement Amount 363 represents a relative amount of movement as the measurement result. Here, Movement Amount 363 represents the relative amount of movement in the form of a three-dimensional vector in the coordinate system of the work space.

(2) Tag Detection Table

Figure 12B:
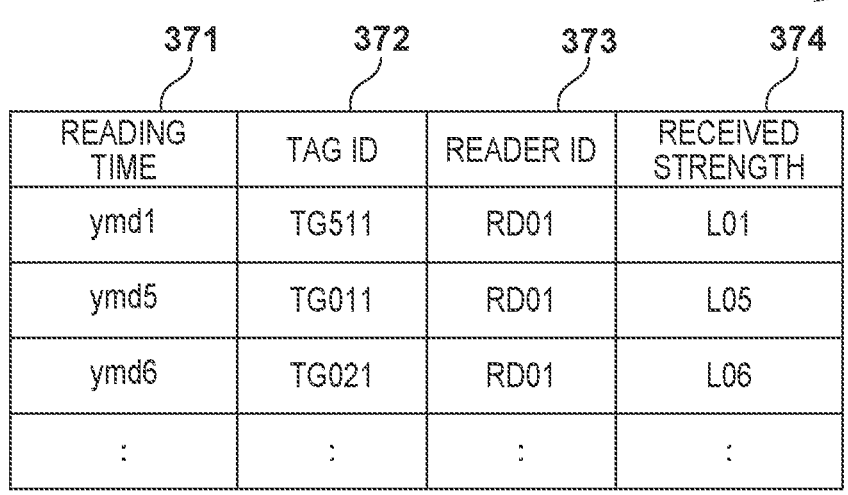
FIG. 12B is an explanatory diagram illustrating an example of a configuration of a tag detection table according to an embodiment.

FIG. 12B illustrates an example of a configuration of the tag detection table 370. The tag detection table 370 is a table for accumulating records of reading result data received from tag readers 110 (hereinafter, referred to as "reading result records"). The tag detection table 370 has four data elements, namely Reading Time 371, Tag ID 372, Reader ID 373, and Received Strength 374. Reading Time 371 indicates the time at which the tag ID has been read for each reading result record. Tag ID 372 indicates a tag ID that has been read for each reading result record. Reader ID 373 uses a value of Reader ID 341 in the reader table 340 to indicate a tag reader 110 that has read the tag for each reading result record. In the example in FIG. 12B, the first record in the tag detection table 370 indicates that the tag reader 110 identified by the reader ID "RD01" read a tag ID "TG511" (e.g., the tag ID of the position tag 40 for "Floor A1") at the time "ymd1". The second record indicates that the tag reader 110 read a tag ID "TG011" (e.g., the tag ID of the target tag 50 for "Material A1") at the time "ymd5". The third record indicates that the tag reader 110 read a tag ID "TG021" (e.g., the tag ID of the target tag 50 for "Material B1") at the time "ymd6". Received Strength 374 indicates a reception level of a signal received by the tag reader 110 at the time of reading the tag, for each reading result record.

(3) Location Estimation

Assume that a certain tag reader 110 has read a tag ID from a certain target tag 50 at a first point in time, and has furthermore read a tag ID from a certain position tag 40 at a second point in time. The second point in time may be before or after the first point in time. The estimation unit 232 can estimate the positional coordinates of the location of the management target to which the detected target tag 50 is attached based on the relative amount of movement of the tag reader 110 between the first point in time and the second point in time, and the known position of the detected position tag 40.

Specifically, the estimation unit 232 adds each record of the measurement result data received from the portable system 100 via the communication unit 210 to the movement amount table 360 as a measurement result record. The estimation unit 232 also adds each record of the reading result data received from the portable system 100 via the communication unit 210 to the tag detection table 370 as a reading result record. If the target tag 50 has been detected by the tag reader 110, the estimation unit 232 can estimate the positional coordinates (u,v,h) of the point where the target tag 50 is located at that point in time according to the following formula:

$$(u,v,h) = (U_0 + (X - X_0), V_0 + (Y - Y_0), H_0 + (Z - Z_0))$$

where, (X,Y,Z) denotes the amount of movement of the tag reader 110 at the time when the tag ID is read from the target tag 50. Additionally, $(X_0, Y_0, Z_0)$ denotes the amount of movement of the tag reader 110 at the time when the tag ID is read from a position tag selected as a reference for the estimation (hereinafter, referred to as "reference position tag"). $(U_0, V_0, H_0)$ denotes known positional coordinates of the installation position of the reference position tag. Note that in the variation described above, a height direction component H may be derived by applying a measured value of the atmospheric pressure to a relational expression representing an air pressure-to-height model, rather than using the above-described formula. The estimation unit 232 updates the field of Coordinates 316 in the target table 310 with the latest positional coordinates of the management target estimated in this manner.

If the same target tag 50 has been detected a plurality of times in a certain period, the estimation unit 232 may estimate the positional coordinates of the corresponding management target based on the relative amount of movement of the tag reader 110 at the point in time when the reception strength of the signal was the highest. Additionally, if the same target tag 50 has been detected a plurality of times in a certain period, the estimation unit 232 may estimate that the corresponding management target is positioned in the center of the plurality of detected positions derived through the above-described formula (e.g., a center of gravity position).

Based on the correlation between the result of reading the tag ID from the target tag 50 of a certain management target and the result of reading the tag ID from at least one position tag 40, the estimation unit 232 may select the reference position tag to be used in the estimation of the location of that management target. Here, the correlation may include one or both of a temporal correlation and a spatial correlation. For example, focusing on each position tag 40 in order from the smallest difference in reading time of the tag ID with respect to a certain target tag 50, the estimation unit 232 can select, as the reference position tag, the first position tag 40 that satisfies both the following conditions 1 and 2:

Condition 1: a linear distance between the estimated positions of the tag reader at two reading times is less than a first threshold (separate threshold-based determinations may be made for a distance within a horizontal plane and a distance in the height direction)

Condition 2: the cumulative movement distance of the tag reader between the two reading times (the amount of movement along a movement path) is less than a second threshold The estimation unit 232 estimates that the corresponding management target is located in the section associated with the tag ID of the reference position tag selected according to the conditions described above. In other words, the value of Installation Section 332 in the position tag table 330, of the reference position tag selected for the target tag 50 of a certain management target, identifies as the located section of that management target. The estimation unit 232 updates the field of Located Section 315 in the target table 310 with the section ID of the latest located section of the management target estimated in this manner. Note that for a management target for which a reference position tag cannot be selected due to there being no position tag 40 that satisfies the conditions described above, the estimation unit 232 may determine that the location is unknown, and leave the fields of Located Section 315 and Coordinates 316 blank.

<3-4. Updating Process Status>

The status determination unit 233 checks a location of each management target, estimated based on a result of reading the tag ID from the target tag 50 by the tag reader 110, against an expected location indicated in the work process table 350 to determine a status of a work process regarding that management target. In the present embodiment, the status determination unit 233 checks the location estimated for each management target against the expected location of the work process, at different granularities depending on type information associated with that management target. In other words, in the present embodiment, the granularity of checking a location of each management target against an expected location (hereinafter, referred to as "matching level") is variable. The granularity control table 380 of the work DB 220 is a table that holds mapping between the type information associated with each management target and the matching level.

For example, it is assumed that the granularity control table 380 defines that a location is checked against an expected location at a first level for a certain type. In this case, when the location of the corresponding management target is equal to a first level section corresponding to the expected location in a certain work process or any lower-level section belonging to that first level section, the status determination unit 233 may determine that the work process for that management target is complete.

In a first practical example, the type information which determines the granularity of checking a location against an expected location includes a target type indicating a type of each management target (e.g., the value of Target Type 314 in the target table 310). In this case, the status determination unit 233 checks the location of a first management target for which the target type indicates a first type against the expected location at a first spatial granularity, and checks the location of a second management target for which the target type indicates a second type different from the first type against the expected location at a second spatial granularity different from the first spatial granularity.

FIG. 13A illustrates an example of a configuration of a granularity control table 380a according to the first practical example. Here, the granularity control table 380a has three data elements, namely Target Type 381, Type Name 383, and Matching Level 385. Target Type 381 is identification information for uniquely identifying each of target types that are selectable as a type of a management target. Type Name 383 represents a name of each target type. Matching Level 385 represents a granularity of checking, set in advance for each target type. The value of Matching Level 385 corresponds to the value of Level 324 in the section table 320, i.e., indicates the depth of the matching level in a tree-form hierarchical relationship of the plurality of sections. In the example in FIG. 13A, the matching level of management targets which are classified into a target type "T1" is "2". Accordingly, the status determination unit 233 checks a management target classified into the target type "T1" at the granularity of a section of which Level 324 indicates "2" in the section table 320. For example, assume that a target type of a certain management target is "T1", and an expected location of that management target in a certain work process is "Building A". In the example of the section table 320 in FIG. 6, the value of Level 324 for "Building A" is equal to "2". Accordingly, when the estimated located section for the management target is "Building A" or equal to one of the lower-level sections belonging to "Building A", the status determination unit 233 determines that the work process related to that management target is complete. Here, the "lower-level sections" for "Building A" include "Floor A1", "Floor A2", "Room A2-1", "Room A2-2", and the like.

Items which are so-called general-purpose materials are used in various parts of a building and are also interchangeable between items of the same type, and the destinations thereof are therefore often specified at a relatively coarse granularity for movement. In contrast, since special-purpose items with individual specifications are assumed to be used at specific points, the destinations thereof may be specified at a relatively fine granularity for movement. There are also items that play an intermediate role between general-purpose materials and special-purpose items. According to the first practical example described here, various requirements for status updates, which are affected by a type of an item or a management target, can be handled flexibly.

In a second practical example, the type information, which determines a granularity of checking a location against an expected location, includes a process type that indicates a type of each of a plurality of work processes in association with each management target (e.g., the type indicated by the work process table 350). In this case, when the process type of a first work process indicates the first type, the status determination unit 233 checks the location of the management target against the expected location at the first spatial granularity when updating the status related to the first work process. Additionally, when the process type of a second work process indicates the second type, which is different from the first type, the status determination unit 233 checks the location of the management target against the expected location at the second spatial granularity, which is finer than the first spatial granularity, when updating the status related to the second work process. Typically, the second work process here can be a work process which follows the first work process.

FIG. 13B illustrates an example of a configuration of a granularity control table 380b according to the second practical example. Here, the granularity control table 380b has three data elements, namely Process Type 382, Type Name 384, and Matching Level 385. Process Type 382 is identification information for uniquely identifying each of candidates for a type of a work process. Type Name 384 represents a name of each process type. In the example in FIG. 13B, Process Type 382 is defined as a character string expressing a pattern of Process ID 353 in the work process table 350, where x corresponds to an arbitrary character. For example, the process ID "P11" matches the process type "Px1", and is classified into a process type named "delivery to site". Likewise, the process ID "P12" matches the process type "Px2", and is classified into a process type named "floor distribution". In the example illustrated in FIG. 13B, the matching level for the process type classified as the process type "Px2" is "3". Accordingly, the status determination unit 233 performs checking at the granularity of a section of which Level 324 indicates "3" in the section table 320 when updating the status of the work process identified by the process ID "P12". For example, assume that an expected location of a management target in that work process is "Floor A2". In the example of the section table 320 in FIG. 6, the value of Level 324 for "Floor A2" is equal to "3". Accordingly, when the estimated located section for the management target is "Floor A2" or equal to one of the lower-level sections belonging to "Floor A2", the status determination unit 233 determines that this work process regarding that management target is complete. Here, the "lower-level section" for "Floor A2" includes "Room A2-1", "Room A2-2", and the like.

In many types of work, such as constructing buildings or transport infrastructure, setting up event venues, or the like, the points where involved items should be located change as the work progresses. In the first half of the work, the individual items may be transported to the work site at a relatively coarse granularity, whereas in the second half of the work, the individual items may need to be delivered to specific points according to intended uses thereof. According to the second practical example described here, such various requirements for the arrangement of the management targets for each work process can be handled flexibly.

It is also conceivable to combine the above-described first practical example and the second practical example. FIG. 13C illustrates an example of a configuration of a granularity control table 380c according to a combination of the first practical example and the second practical example. In the example in FIG. 13C, the granularity control table 380c has three data elements, namely Target Type 381, Process Type 382, and Matching Level 385. By using this granularity control table 380c, the location of each management target can be checked against the expected location at different granularities for each target type and for each process type.

When the type information associated with a certain management target indicates a predetermined type, the status determination unit 233 may check the location of the management target against the expected location at the level of the positional coordinates. For example, in the example in FIG. 9, it is assumed that a process ID "P19" indicates the predetermined type mentioned here. In the work process table 350, three-dimensional positional coordinates (u5,v5,h5) are registered in the field of Expected Location 356 of a management target associated with the process ID "P19". In this case, when the distance between the estimated positional coordinates for the management target and the positional coordinates (u5,v5,h5) serving as the expected location is below a pre-set distance threshold, the status determination unit 233 may determine that the work process for that management target has been completed. Incorporating fine checking at a level of positional coordinates rather than located sections in this manner makes it possible to automatically determine whether a specific item (e.g., a special-purpose item) is installed or mounted at a point as designed in a certain work process and to reflect the result thereof in the status.

According to the methods describe in this section, the status determination unit 233 checks the latest location of each management target handled in each work process against its expected location, and updates the value of Process Status 357 for that management target determined to have appropriately moved to its expected locations to "Completed".

<3-5. Presentation of Position Information>

The display control unit 234 is capable of causing the display unit 171 of the user terminal 160 to display information regarding each of the plurality of management targets in order to help a user to ascertain locations of the management targets and to verify statuses thereof. In particular, in the present embodiment, the work space is regularly segmented into a plurality of coordinate regions (also referred to as "grids") to facilitate a broad or general understanding of locations of the management targets. The display control unit 234 is then capable of displaying, on a screen, coordinate region information regarding coordinate regions to which positional coordinates estimated for respective management targets belong. In addition, the display control unit 234 is capable of displaying, on a screen, located section information regarding estimated located sections for respective management targets. Because the display control unit 234 can control the display of information regarding the management targets in this manner, the process management system 1 may also be referred to as a "display control system 1".

Figure 14:
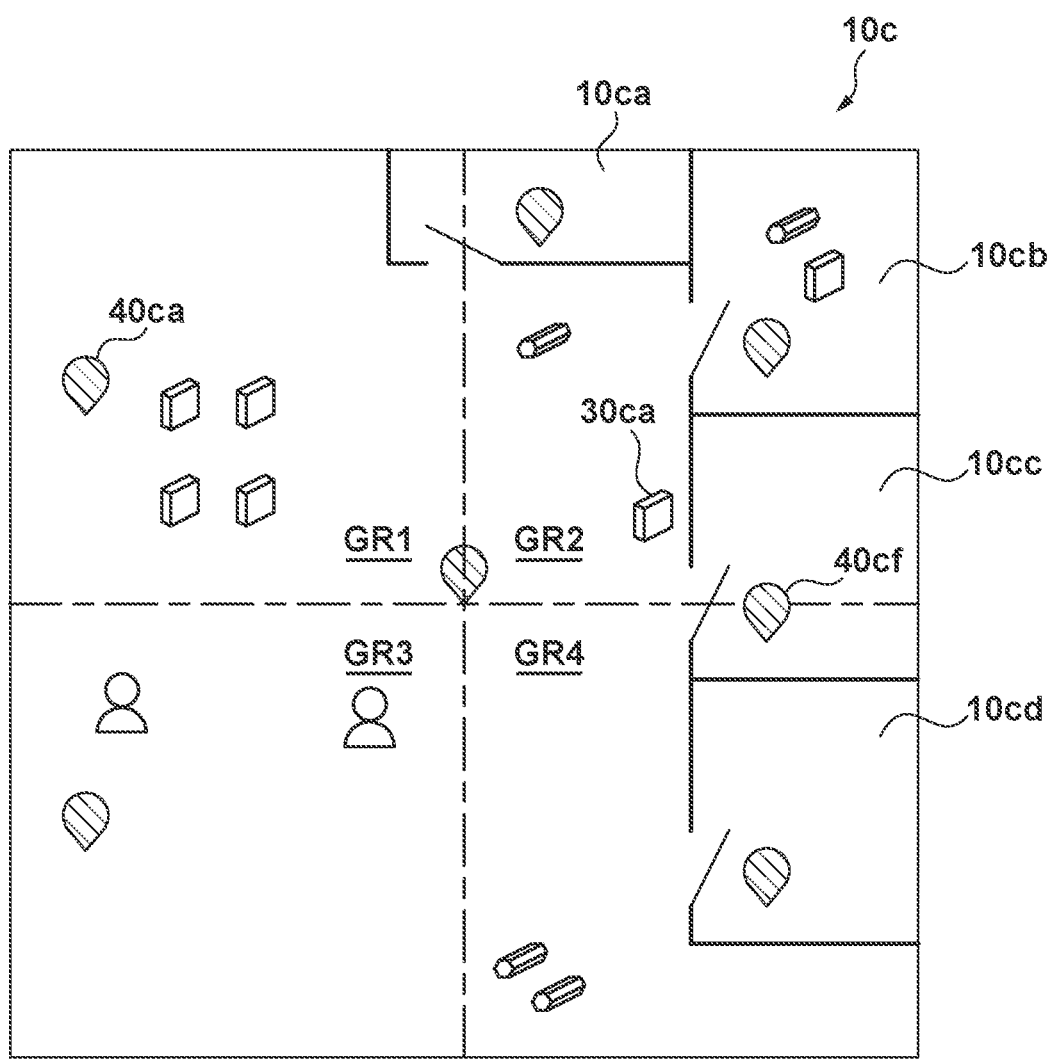
FIG. 14 is an explanatory diagram illustrating examples of a plurality of coordinate regions.

FIG. 14 illustrates an example of a plurality of coordinate regions set in a work space. A section 10c illustrated in FIG. 14 corresponds to a single floor of a building. The section 10c includes sections 10ca, 10cb, 10cc and 10cd, which correspond to rooms on that floor. In FIG. 14, a total of four rectangular coordinate regions GR1 to GR4, laid out in a 2×2 arrangement, are set regularly in the section 10c. The shapes of the coordinate regions may be uniform, and the spacing of the boundary lines between the coordinate regions may be constant on each coordinate axis. The boundary lines of the coordinate regions indicated by the dot-dash lines in FIG. 14 are not necessarily aligned with the boundary lines of the sub-sections (the sections 10ca, 10cb, 10cc and 10cd) in the space indicated by the bold lines in FIG. 14.

The number and size of the coordinate regions set in the work space are not limited to the example illustrated in FIG. 14. The size of the coordinate regions may be fixedly set in advance. Alternatively, the display control unit 234 may set the size of the coordinate regions to different values depending on the sizes of the sections to be displayed. The display control unit 234 may also set the size of the coordinate regions variably in accordance with a user setting (e.g., a setting specified through a user input, or a setting written in a settings file saved by a user). This makes it possible for a user to browse the coordinate region information (described later) at various granularities according to his or her purpose.

FIG. 14 also illustrates icons representing installation positions of a plurality of position tags (e.g., position tags 40ca and 40cf) installed in the section 10c. Furthermore, icons representing the estimated positions of the plurality of management targets (e.g., an item 30ca) located in the section 10c are also illustrated. For example, the item 30ca is located outside the section 10cc, but near the door of the section 10cc. Accordingly, when the position tag 40cf installed in the section 10cc and the target tag of the item 30ca are detected in a short period of time by the tag reader 110 passing through the door of the section 10cc, there is a possibility that the located section of the item 30ca will be mistakenly determined to be the section 10cc. The display of information in units of coordinate regions (described later) is advantageous in that it is not affected by such errors in the recognition of located sections.

Figure 15:
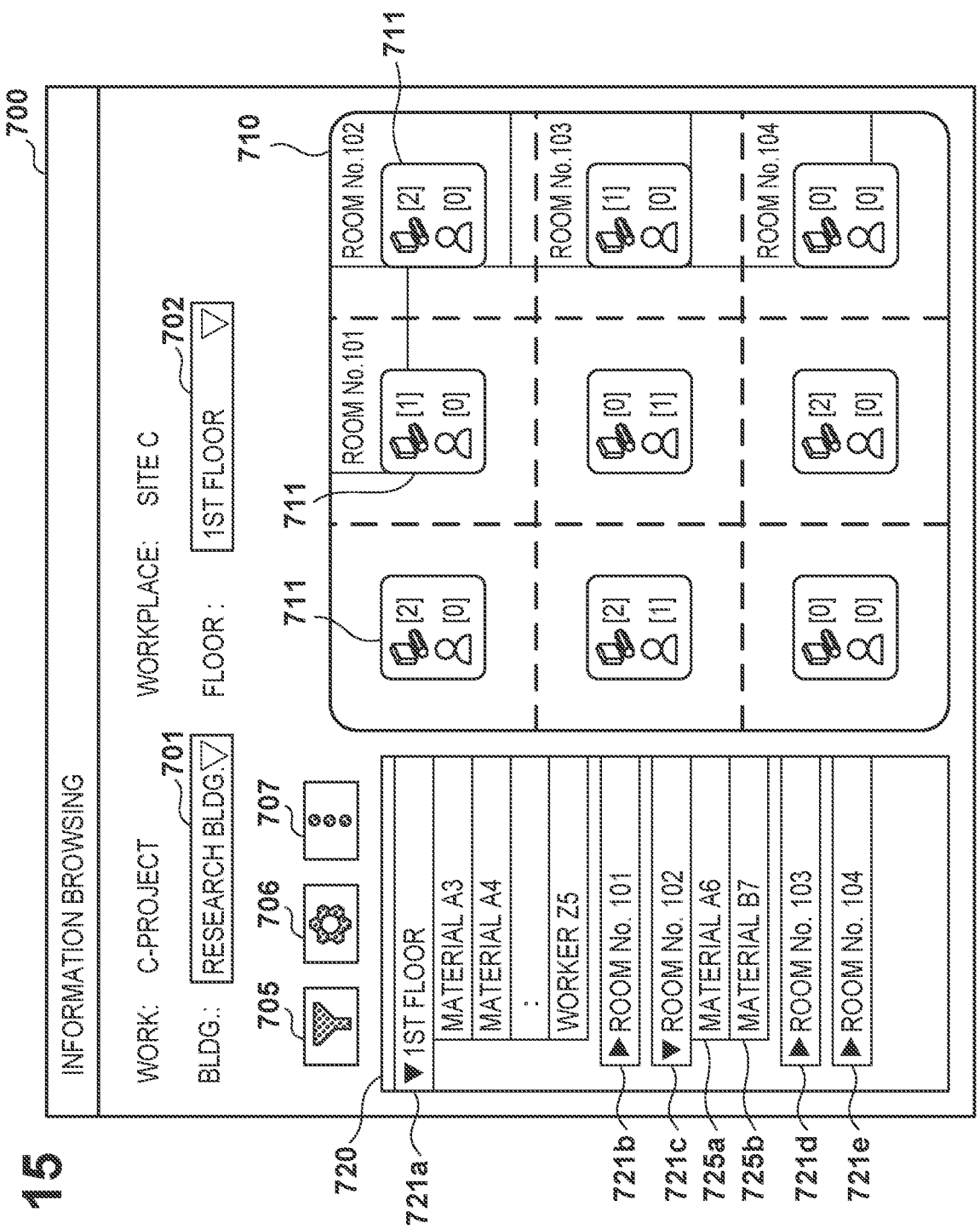
FIG. 15 is an explanatory diagram illustrating a first example of a configuration of an information browsing screen.

FIG. 15 illustrates a first example of the configuration of an information browsing screen 700 that can be provided by the display control unit 234 in the present embodiment. The information browsing screen 700 may be called in response to a user input made through the operation unit 165 of the user terminal 160, for example, and displayed by the display unit 171 of the user terminal 160. Referring to FIG. 15, the information browsing screen 700 includes a building selection field 701, a floor selection field 702, function buttons 705, 706, and 707, a map display area 710, and a list display area 720. When a building and floor for which the user wishes to browse the position information are selected in the fields 701 and 702, a map image of the selected floor is displayed in the map display area 710. The display control unit 234 superimposes boundary lines (broken lines, in FIG. 15) representing the boundaries of the plurality of coordinate regions on the map image, and further superimposes the coordinate region information thereon. In the example in FIG. 15, a total of nine coordinate regions, arranged in a 3×3 layout, are set in the selected floor.

As an example, the coordinate region information displayed on the screen may include statistics information regarding management target(s) estimated to be located in each coordinate region. The statistics information here may include one or more of the following, for example:

1) the number of management targets estimated to be currently located in each coordinate region
2) the number of management targets, for each class, estimated to be currently located in each coordinate region
3) the number of management targets estimated to be located in each coordinate region within a set period in the past
4) the number of management targets, for each class, estimated to be located in each coordinate region within a set period in the past
5) the number of items in any of 1) to 4) that conform to specific filtering conditions The filtering conditions may include one or more of, for example, a condition related to management targets, a condition related to work processes, and a condition related to a tag reader that detected a management target. For example, the condition related to management targets may include a condition related to a name or a target type of management targets. The condition related to work processes may include a condition related to a process ID, due date, expected location, process status, completion date, or auxiliary status. The condition related to the tag reader may include a condition indicating only management target(s) detected by a specific tag reader (e.g., the tag reader used by a logged-in user).

The function button 705 in the information browsing screen 700 is a button for calling a UI for allowing a user to specify the above-described filtering conditions. Such a UI may be configured according to any publicly-known method, and will therefore not be described in detail here. In the example in FIG. 15, a box 711 is superimposed on each of the nine coordinate regions in the map display area 710. Each box 711 indicates the number of items and the number of users estimated to be currently located in the corresponding coordinate region. Presenting the statistics information in units of coordinate regions in this manner makes it possible for a user to easily and quickly ascertain an overview of locations of management targets at the latest time or at a point in time specified by the user. This also makes it possible to avoid cluttering the screen with information in situations where many management targets exist.

As illustrated in FIG. 15, the display control unit 234 may cause the coordinate region information to be displayed in a first part of the information browsing screen 700 (the map display area 710), while causing the located section information to be displayed in parallel in a second part of the screen (the list display area 720). As an example, the located section information may include a list of management targets estimated to be located in each section. In the example in FIG. 15, the list display area 720 includes list items 721a, 721b, 721c, 721d, and 721e, which can be expanded and collapsed. The list item 721a corresponds to "1st Floor" selected in the floor selection field 702. The list items 721b, 721c, 721d, and 721e correspond to four respective rooms on "1st Floor." When the user manipulates one of the list items 721, a list of management targets located in the section corresponding to the list item 721 that has been manipulated is displayed (and when the same list item 721 is manipulated again, the list of management targets which had been displayed is hidden). In the example in FIG. 15, the list item 721c corresponding to "Room 102" is expanded, and the list items 725a and 725b corresponding to two items located in "Room 102" are displayed. Providing indications of such coordinate region information and located section information in parallel makes it possible for a user to examine in more detail where and what management targets are located in the work space while comparing two displays having different formats.

The function button 706 is a button for calling a UI that enables a user to change settings related to the display of information. The function button 707 is a button for calling a UI that allows for activating some kind of auxiliary function. These UIs may be configured according to any publicly-known method, and will therefore not be described in detail here. The settings related to the information display may include, for example, the size of coordinate regions described above. The auxiliary function may include, for example, downloading a list data file for the management targets displayed.

Unlike the example illustrated in FIG. 15, the located section information may include statistics information regarding management target(s) estimated to be located in each section. The statistics information here may include one or more of the following, for example:

1) the number of management targets estimated to be currently located in each section
2) the number of management targets, for each class, estimated to be currently located in each section
3) the number of management targets estimated to be located in each section in a set period in the past
4) the number of management targets, for each class, estimated to be located in each section in a set period in the past
5) the number of items in any of 1) to 4) that conform to specific filtering conditions Here, the filtering conditions may be the same as the conditions described above with respect to the coordinate region information.

Figure 16:
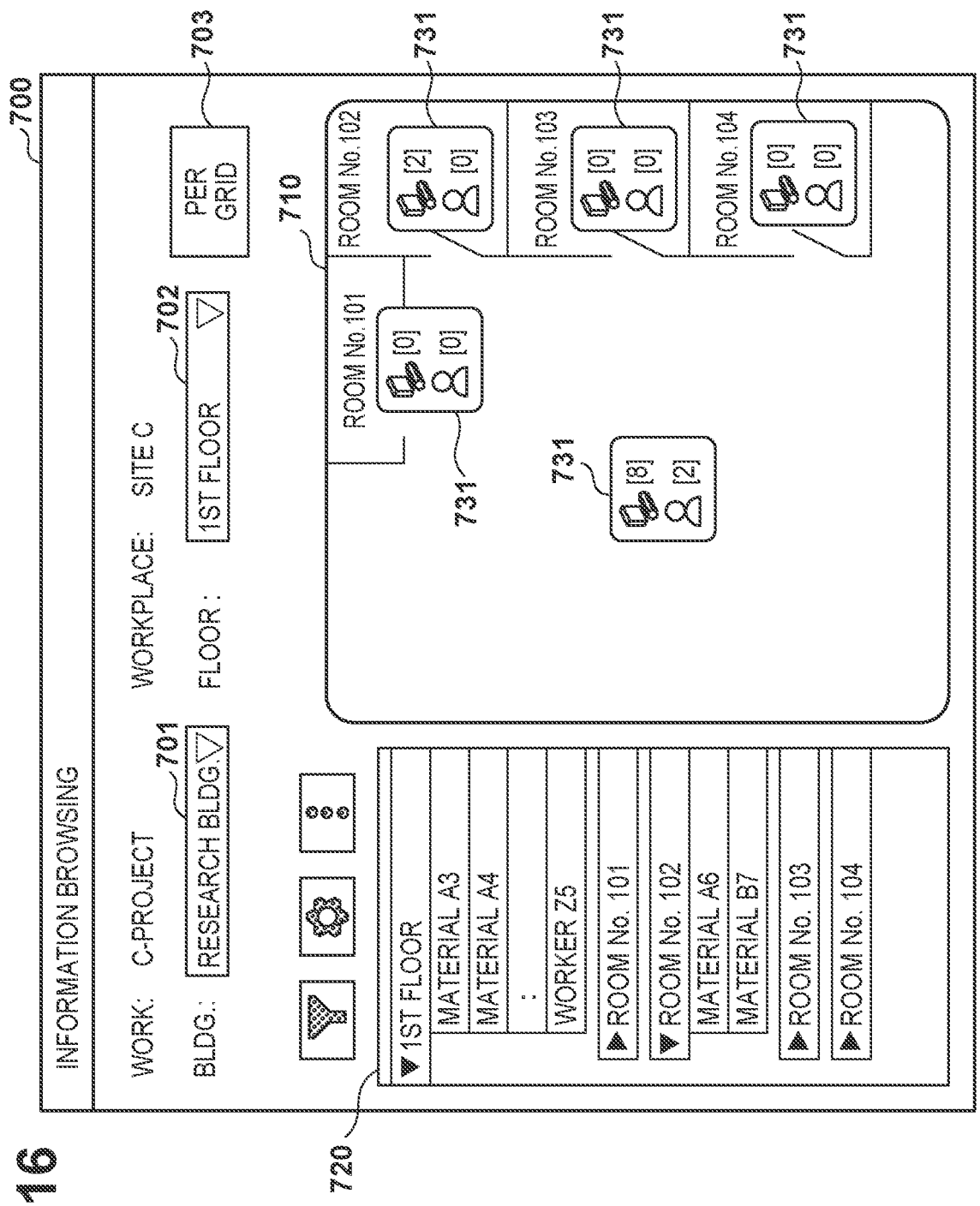
FIG. 16 is an explanatory diagram illustrating a second example of a configuration of an information browsing screen.

FIG. 16 illustrates a second example of the configuration of the information browsing screen 700 that may be provided by the display control unit 234 in the present embodiment. In the second example, the display control unit 234 causes one of the coordinate region information and the located section information to be displayed superimposed on the map image in the map display area 710, in accordance with a selection made by the user. Referring to FIG. 16, the information browsing screen 700 includes a display switch button 703 in addition to the constituent elements described with reference to FIG. 15. The display switch button 703 is a button for switching the information displayed in the map display area 710 between the coordinate region information and the located section information. For example, if the user manipulates the display switch button 703 while the coordinate region information is displayed in the map display area 710, the display control unit 234 causes the located section information to be displayed in the map display area 710 instead of the coordinate region information. If the user manipulates the display switch button 703 while the located section information is displayed in the map display area 710, the display control unit 234 causes the coordinate region information to be displayed in the map display area 710 instead of the located section information. In the example in FIG. 16, the boundary lines of the coordinate regions and the boxes 711 have been made invisible in the map display area 710, and five boxes 731 are superimposed on the map image instead. Each box 731 indicates the number of items and the number of users estimated to be currently located in the corresponding section.

Although the example described here is one where one of a first display mode, in which the coordinate region information is superimposed on the map image, and a second display mode, in which the located section information is superimposed on the map image, can be selected, it may also be conceivable to have a third display mode to be selectable, in which individual positional coordinates of management targets are superimposed. In the third display mode, the display control unit 234 can, for example, arrange icons representing the respective management targets at points in the map display area 710 corresponding to the positional coordinates of the management targets that satisfy specified filtering conditions.

In general, positional coordinates that rely on self-localization techniques are susceptible to cumulative error in sensor outputs and may sometimes not accurately capture a position of a management target. Accordingly, making it possible to display the located section information according to a user selection in the map display area 710, as in the example in FIG. 16, allows for providing useful information to a user even when the accuracy of the positional coordinates is insufficient and effectively helping the user to understand locations of management targets.

Figure 17:
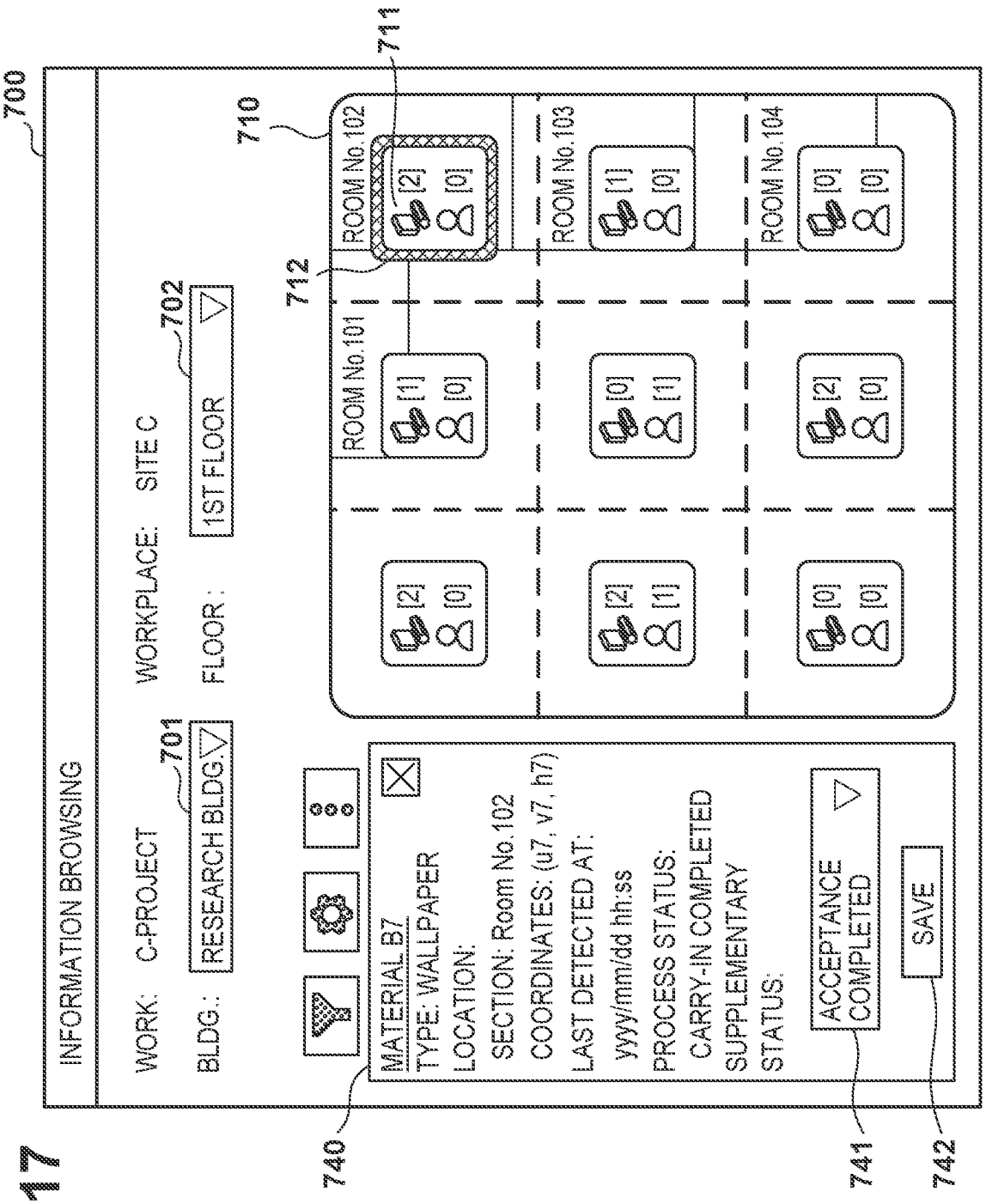
FIG. 17 is an explanatory diagram illustrating an example of displaying detailed information regarding a management target.

The display control unit 234 may cause detailed information about a specific management target specified by a user to be displayed in the screen. FIG. 17 illustrates an example of the display of such detailed information. For example, when the user manipulates a list item 725b in the information browsing screen 700 illustrated in FIG. 15, the display control unit 234 causes the list display area 720 of the information browsing screen 700 to transition to a detail display area 740 illustrated in FIG. 17. Detailed information about "Material B7", which is a management target specified by the user, is displayed in the detail display area 740. For example, that detailed information includes the type, located section, positional coordinates, last detection date/time, and status information for "Material B7".

Furthermore, in the example in FIG. 17, an auxiliary status field 741 and a button 742 are located in the detail display area 740. In the auxiliary status field 741, the user can select one of a plurality of candidate status values set in advance. The status value selected in the auxiliary status field 741 can be reflected in the field of Auxiliary Status 359 in the work process table 350 described above, in response to the button 742 being manipulated, for example. In the example in FIG. 17, a status value of "Acceptance Completed" is selected in the auxiliary status field 741. For example, registration of an acceptance confirmation being completed through the auxiliary status field 741 in a given work process may be a condition for starting to update the status of a subsequent work process.

In response to the user selecting a specific management target in the screen, the display control unit 234 may cause an indication for the coordinate region (or located section) where the selected management target is estimated to be located to be displayed in the map display area 710. In the example in FIG. 17, the positional coordinates of "Material B7" are present in the upper-right coordinate region among the nine coordinate regions, and thus an indication 712 is added to the box 711 superimposed on the upper-right coordinate region to emphasize the frame of the box. This indication 712 may also be a type of coordinate region information. The user who sees the indication 712 can easily know where the management target of interest is located in the work space.

4. Flow of Processing

This section will describe several examples of processing flows that can be executed in the process management system 1, with reference to the flowcharts in FIGS. 18 to 22. Note that in the following descriptions, the processing steps are indicated by an S, indicating "step".

<4-1. Data Transmission Processing>

Figure 18:
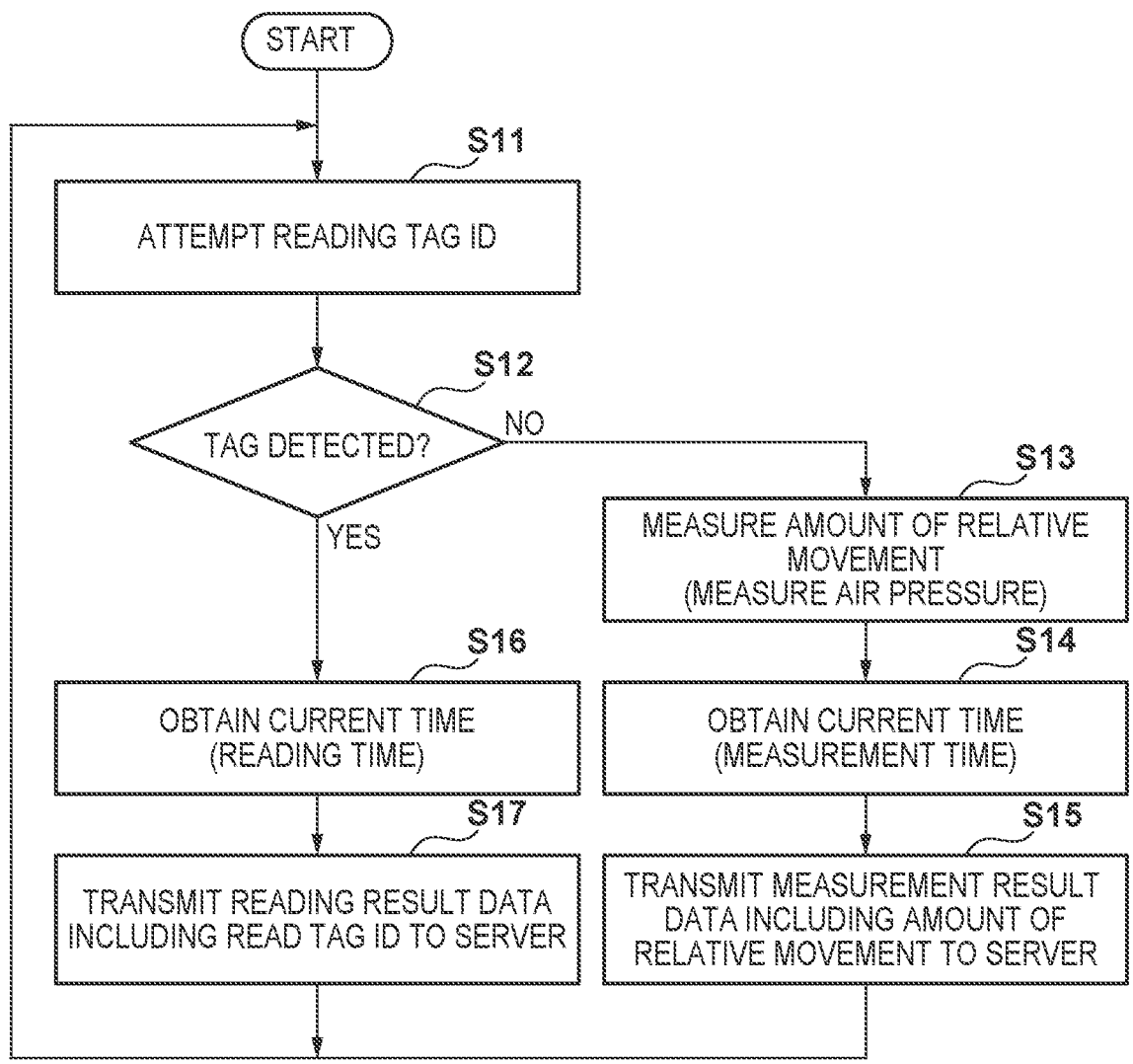
FIG. 18 is a flow chart illustrating an example of a flow of data transmission processing according to an embodiment.

FIG. 18 is a flowchart illustrating an example of a flow of data transmission processing executed by the portable system 100.

First, in step S11, the reading unit 116 of the tag reader 110 attempts to read a tag ID from a nearby RFID tag by emitting electromagnetic waves within its reading range. If, as a result of the tag reading attempt, a tag ID is received from a nearby RFID tag using the electromagnetic wave energy (step S12—YES), the sequence moves to step S16. On the other hand, if no tag ID is received (step S12—NO), the sequence moves to step S13.

In step S13, the measuring unit 114 of the tag reader 110 measures the relative amount of movement of the tag reader 110 based on sensor data output from, for example, a three-axis acceleration sensor, a gyro sensor, and a geomagnetic sensor. Here, the measuring unit 114 may further cause an air pressure sensor to measure atmospheric pressure. Next, in step S14, the control unit 111 obtains the current time as a measurement time by referring to an internal real-time clock, for example. Next, in step S15, the control unit 111 transmits measurement result data including the relative amount of movement (and air pressure value) measured by the measuring unit 114, the measurement time, and the reader ID of the tag reader 110 to the management server 200 through the communication unit 113.

In step S16, the control unit 111 obtains the current time as the reading time of the tag ID. Next, in step S17, the control unit 111 transmits the reading result data, including the read tag ID, the reading time, a reception level, and the reader ID of the tag reader 110, to the management server 200 through the communication unit 113.

The sequence then returns to step S11. Such data transmission processing may be performed iteratively during the period when attempting to read tags is activated in the portable system 100.

<4-2. Location Estimation Processing>

Figure 19:
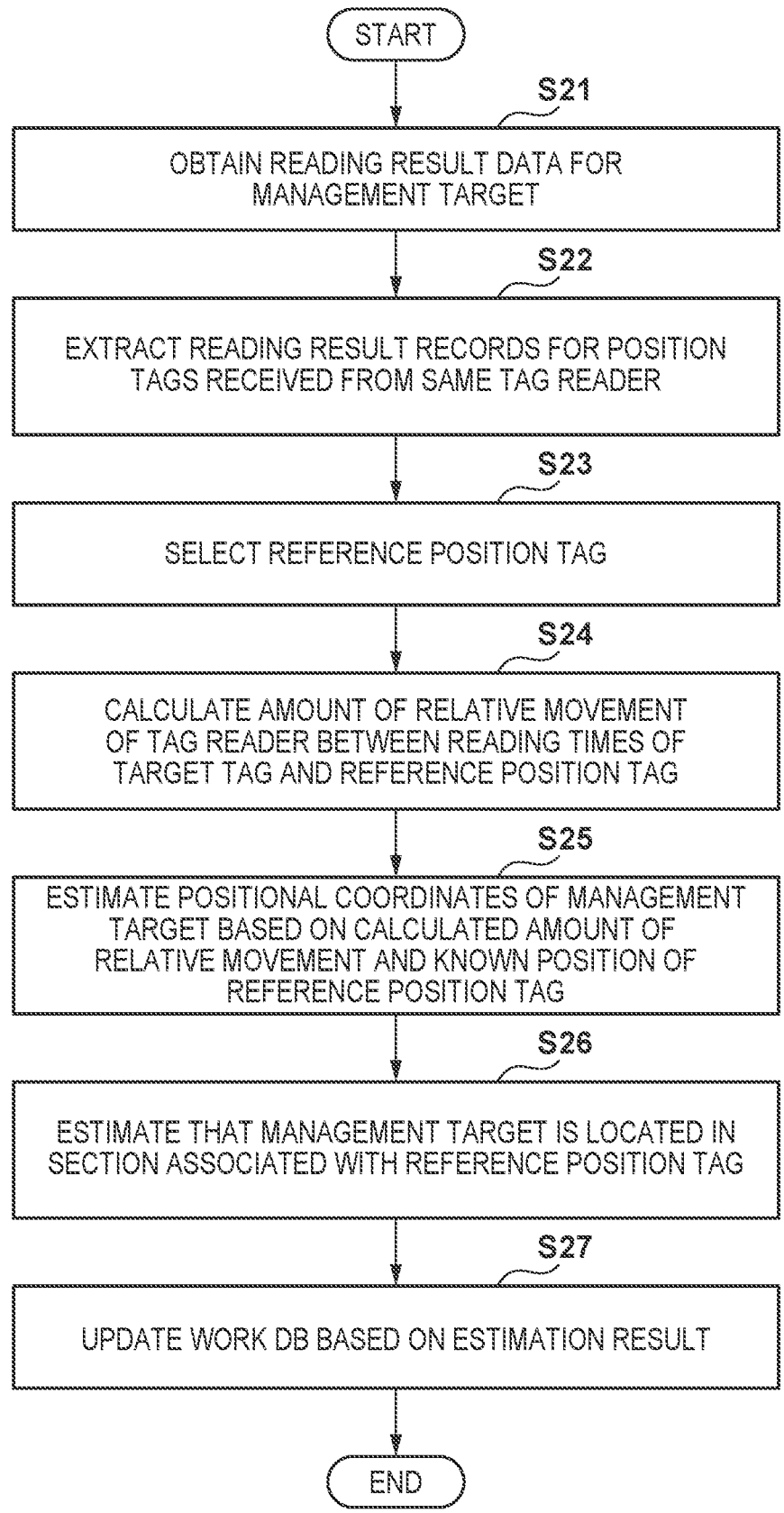
FIG. 19 is a flow chart illustrating an example of a flow of location estimation processing according to an embodiment.

FIG. 19 is a flowchart illustrating an example of a flow of location estimation processing executed by the management server 200. It is assumed that at the point in time when the location estimation processing of FIG. 19 begins, some measurement result records have been accumulated in the movement amount table 360 and some reading result records have been accumulated in the tag detection table 370.

First, in step S21, taking one management target of interest, the estimation unit 232 of the management server 200 obtains the reading result record for the target tag 50 attached to that management target from the tag detection table 370. Next, in step S22, the estimation unit 232 extracts, from the tag detection table 370, reading result records for one or more position tags 40 received from the same tag reader 110 as the one for the reading result record that has been obtained. Next, in step S23, the estimation unit 232 selects one reference position tag as a reference for location estimation, based on correlation between the reading result record for the target tag 50 and the reading result records for the one or more position tags 40.

Next, in step S24, by referring to the measurement result records in the movement amount table 360, the estimation unit 232 calculates the relative amount of movement of the tag reader 110 between the reading time of the target tag 50 and the reading time of the reference position tag. Next, in step S25, the estimation unit 232 estimates the positional coordinates of the management target of interest based on the calculated relative amount of movement of the tag reader 110 and the known position of the reference position tag. Furthermore, in step S26, the estimation unit 232 estimates that the section associated with the reference position tag in the position tag table 330 is the located section of the management target of interest.

Then, in step S27, the estimation unit 232 updates the fields of Coordinates 316 and Located Section 315 in the target table 310 with the coordinate values of the positional coordinates estimated in step S25 and the section ID of the located section estimated in step S26, respectively.

The estimation unit 232 may perform the above-described processing iteratively by taking each of one or more management targets that may have moved within a certain period as a management target of interest in sequence. By executing such processing periodically, the position information indicating the latest location of each management target can be maintained in the work DB 220.

<4-3. Status Update Processing>

Figure 20:
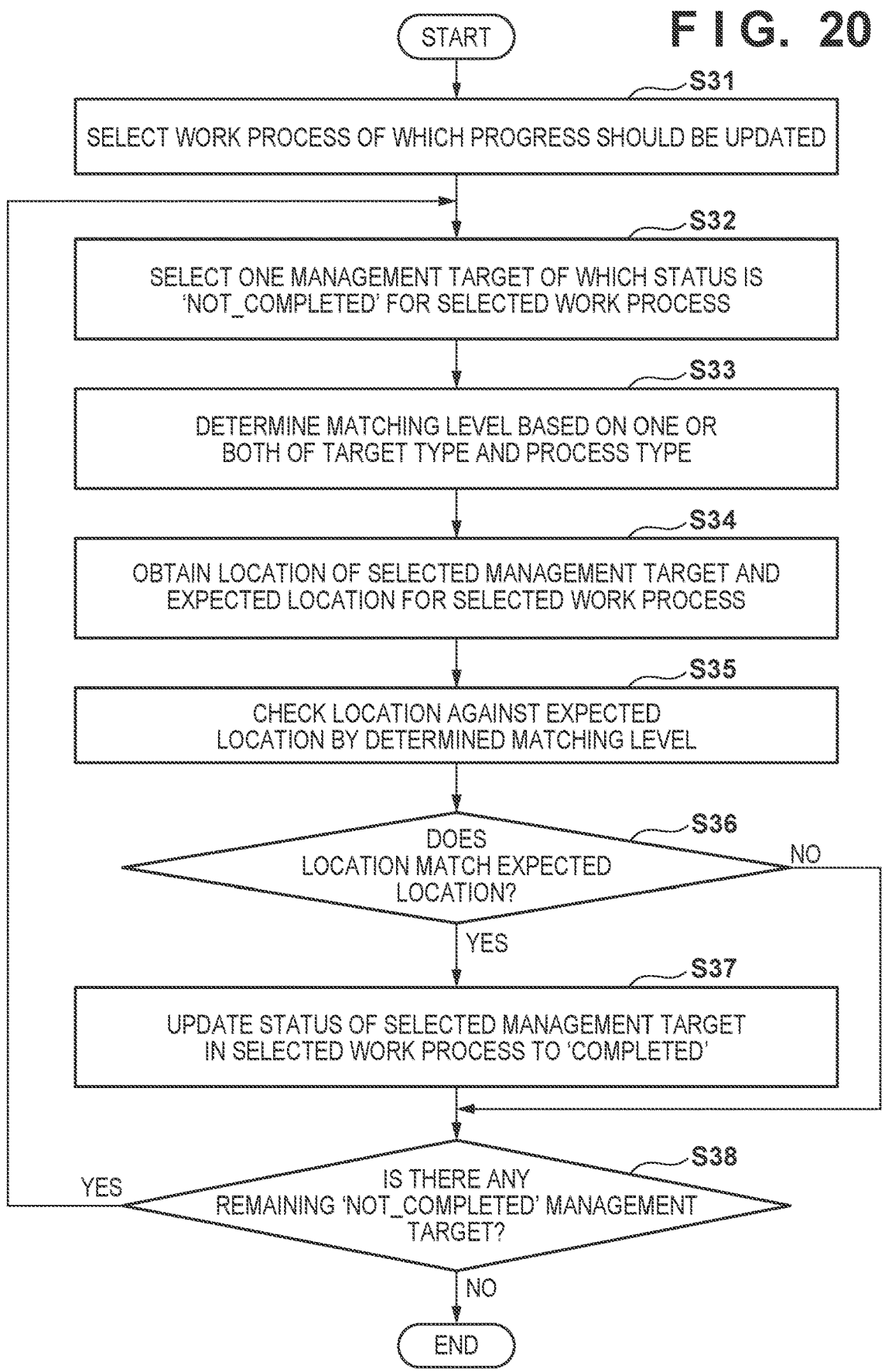
FIG. 20 is a flow chart illustrating an example of a flow of status update processing according to an embodiment.

FIG. 20 is a flowchart illustrating an example of a flow of status update processing executed by the management server 200. The status update processing illustrated in FIG. 20 may, for example, be executed periodically in the same manner as the location estimation processing illustrated in FIG. 19, or may be executed in response to an instruction to update statuses being input at the user terminal 160.

First, in step S31, the status determination unit 233 selects a work process for which progress is to be updated from among work processes constituting a work defined in the work process table 350. The work process selected here may be, for example, a work process associated with a management target of which location has changed, a work process specified by a user, or a work process of which due date has arrived. Then, in step S32, the status determination unit 233 selects one management target for which the status of the selected work process is "Not_Completed".

Next, in step S33, the status determination unit 233 determines the matching level for checking the location against the expected location by referring to the granularity control table 380 based on one or both of the target type of the selected management target and the process type of the selected work process. Next, in step S34, the status determination unit 233 obtains the latest location (located section or positional coordinates) of the selected management target from the target table 310. The status determination unit 233 also obtains, from the work process table 350, the expected location of the management target in the selected work process.

Next, in step S35, the status determination unit 233 checks the location of the selected management target against the expected location at the matching level determined in step S33. For example, if the expected location is represented by the section ID and the level of that section is equal to the matching level, the location may be determined to match the expected location when the section ID of the located section of the management target is equal to the section ID of the expected location or of any lower-level section belonging to the expected location. If the expected location is represented by positional coordinates and the matching level indicates checking at the level of positional coordinates, the location may be determined to match the expected location when the distance between the positional coordinates of the management target and the positional coordinates of the expected location falls below a predetermined distance threshold. If the location matches the expected location (step S36—YES), in step S37, the status determination unit 233 updates the status of the selected management target in the selected work process to "Completed". If the matching fails (step S36—NO), step S37 is skipped, and the status is not updated.

Next, in step S38, the status determination unit 233 determines whether there is a remaining management target for which the status of the work process selected in step S31 is "Not_Completed". If there is a remaining management target for which the status is "Not_Completed", the sequence returns to step S32, where the status determination unit 233 selects a new management target for which the status is "Not_Completed" from the remaining management targets and repeats steps S33 to S38. If there is no remaining management target for which the status is "Not_Completed", the status update processing for the work process selected in step S31 ends. Although not illustrated here, the above-described status update processing may of course be further iterated for the other work processes.

<4-4. Display Control Processing>
(1) First Example

Figure 21:
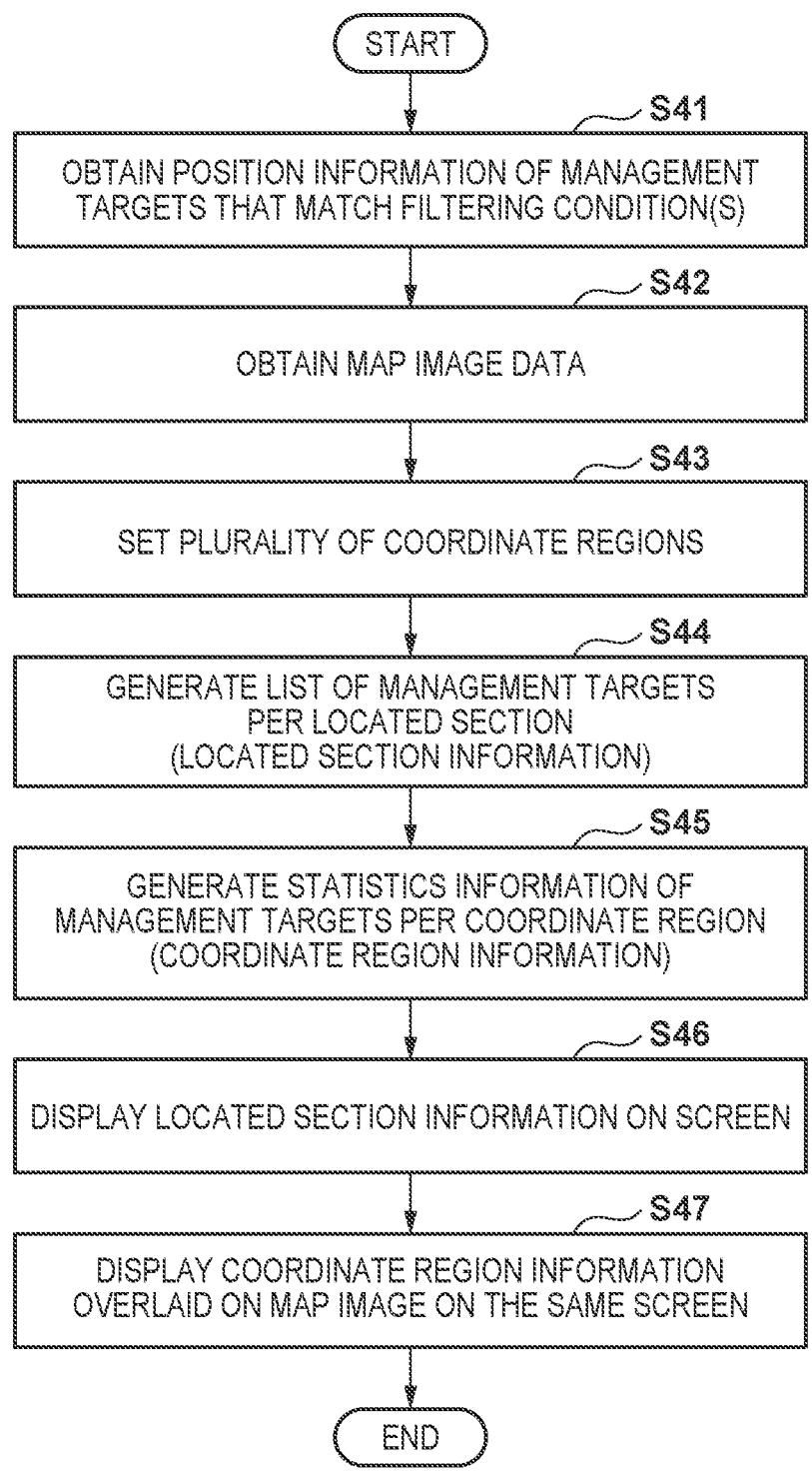
FIG. 21 is a flow chart illustrating a first example of a flow of display control processing according to an embodiment.

FIG. 21 is a flowchart illustrating a first example of a flow of display control processing executed by the user terminal 160 and the management server 200 that cooperate with each other. Here, it is assumed that the information browsing screen 700 according to the first example described with reference to FIG. 15 is called by a user and displayed by the display unit 171 under the control of the control unit 161 of the user terminal 160.

First, in step S41, the display control unit 234 of the management server 200 obtains, from the target table 310, position information of one or more management targets that satisfy filtering conditions that may be specified in the user terminal 160. For example, the display control unit 234 may obtain, from the target table 310, located sections and positional coordinates of the management targets estimated to be located in the specified section at the current time. Next, in step S42, the display control unit 234 obtains the map image data of the specified section from the section table 320. Next, in step S43, the display control unit 234 sets a plurality of coordinate regions in the specified section.

Next, in step S44, the display control unit 234 generates, as the located section information, a list of management targets per located section, based on the located sections of the one or more management targets obtained in step S41. Additionally, in step S45, the display control unit 234 generates, as the coordinate region information, statistics information of the management targets per coordinate region, based on the positional coordinates of the one or more management targets obtained in step S41.

Next, in step S46, the display control unit 234 transmits the generated located section information to the user terminal 160 through the communication unit 210. The control unit 161 of the user terminal 160 controls the display unit 171 to display the list of the management targets per located section in the list display area 720 of the information browsing screen 700. Additionally, in step S47, the display control unit 234 transmits the generated coordinate region information to the user terminal 160 through the communication unit 210 along with the map image data. The control unit 161 of the user terminal 160 controls the display unit 171 to display the statistics information per coordinate region superimposed on the map image in the map display area 710 of the same information browsing screen 700.

If the filtering conditions for management targets to be displayed have changed, the display control processing from step S41 onwards may be re-executed, and the screen display may be updated. Additionally, the display control unit 234 may monitor position information stored in the target table 310 and, if the position information changes, may re-execute the display control processing and cause the control unit 161 of the user terminal 160 to update the screen display.

(2) Second Example

Figure 22:
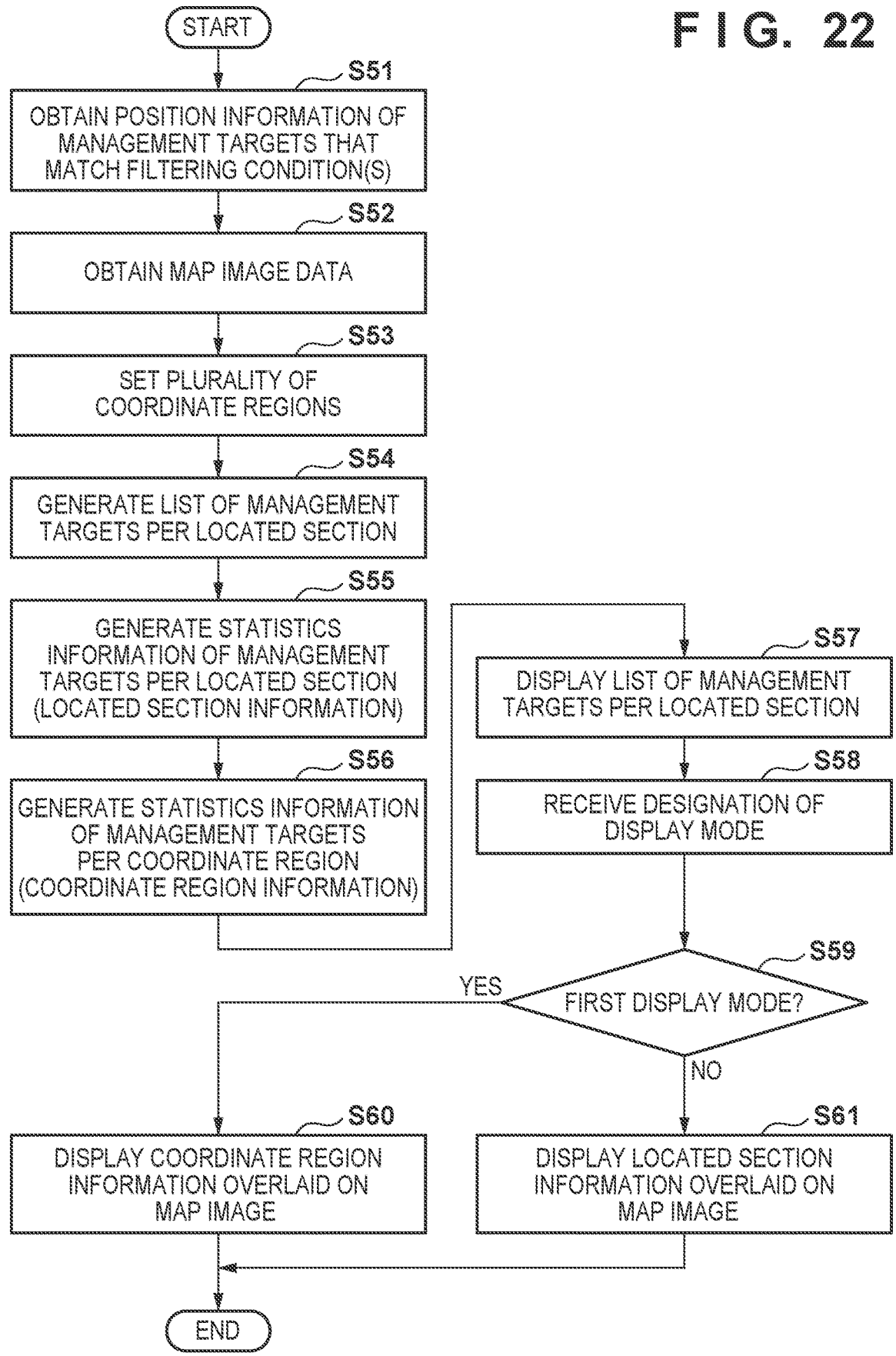
FIG. 22 is a flow chart illustrating a second example of a flow of display control processing according to an embodiment.

FIG. 22 is a flowchart illustrating a second example of a flow of display control processing executed by the user terminal 160 and the management server 200 that cooperate with each other. Here, it is assumed that the information browsing screen 700 according to the second example described with reference to FIG. 16 is called by a user and displayed by the display unit 171 under the control of the control unit 161 of the user terminal 160.

First, in step S51, the display control unit 234 of the management server 200 obtains, from the target table 310, position information of one or more management targets that satisfy filtering conditions that may be specified in the user terminal 160. Next, in step S52, the display control unit 234 obtains the map image data of the specified section from the section table 320. Next, in step S53, the display control unit 234 sets a plurality of coordinate regions in the specified section.

Next, in step S54, the display control unit 234 generates a list of management targets per located section, based on the located sections of the management targets. Additionally, in step S55, the display control unit 234 generates, as the located section information, statistics information of the management targets per located section, based on the located sections of the same management targets. Furthermore, in step S56, the display control unit 234 generates, as the coordinate region information, statistics information of the management targets per coordinate region, based on the positional coordinates of the management targets.

Next, in step S57, the display control unit 234 transmits the generated list of management targets per located section to the user terminal 160 through the communication unit 210. The control unit 161 of the user terminal 160 controls the display unit 171 to display the list of the management targets per located section in the list display area 720 of the information browsing screen 700. Next, in step S58, the control unit 161 accepts a designation of a display mode by a user through the operation unit 165. If the first display mode in which the coordinate region information is superimposed on the map image has been specified (step S59—YES), the sequence moves to step S60. On the other hand, if the second display mode in which the located section information is superimposed on the map image has been specified (step S59—NO), the sequence moves to step S61.

In step S60, the display control unit 234 transmits the coordinate region information to the user terminal 160 through the communication unit 210 along with the map image data. The control unit 161 of the user terminal 160 controls the display unit 171 to display the statistics information per coordinate region superimposed on the map image in the map display area 710 of the information browsing screen 700. On the other hand, in step S61, the display control unit 234 transmits the located section information to the user terminal 160 through the communication unit 210 along with the map image data. The control unit 161 of the user terminal 160 controls the display unit 171 to display the statistics information per located section superimposed on the map image in the map display area 710 of the information browsing screen 700.

As in the first example described above, if the filtering conditions for management targets to be displayed have changed, the display control processing from step S51 onwards may be re-executed, and the screen display may be updated. Additionally, the display control unit 234 may monitor position information stored in the target table 310 and, if the position information changes, may re-execute the display control processing and cause the control unit 161 of the user terminal 160 to update the screen display.

5. Conclusion

Thus far, various embodiments, examples, and variations of the technique according to the present disclosure have been described in detail with reference to FIGS. 1 to 22. In the foregoing embodiment, the section data defines a plurality of sections set in a real space at a plurality of different spatial granularities. The plurality of sections include at least one first level section set in the real space at a first spatial granularity, and at least one second level section set in the at least one first level section at a second spatial granularity that is finer than the first spatial granularity. Then, the location of a management target is checked against the expected location for the work process at different granularities depending on the type information associated with the management target in the process management system, and the status of the work process is updated based on the checking result. According to this configuration, the status can be determined by automatically switching the spatial granularity for checking the location of the management target against the expected location depending on which management target or which work process is having the status updated. This makes it possible to flexibly handle requirements regarding the granularity of checking of locations that are not necessarily uniform in general process management situations, and to improve the efficiency of the process management.

To give a non-limiting example, for so-called general-purpose materials, the destinations thereof may be specified at a broader spatial granularity than special-purpose items having individual specifications. Alternatively, the granularity for checking the location may initially be coarser (i.e., a broader spatial granularity), and become finer (i.e., a narrower spatial granularity) as the work progresses. In the foregoing embodiment, if checking at a broad spatial granularity is permitted, when the location of the management target is equal to a higher-level section corresponding to the expected location or to any lower-level section belonging to the higher-level section, the work process may be determined to be complete with respect to that management target. Accordingly, the status of the work process can be automatically updated to "complete" regardless of where the management target has moved, as long as it is a point belonging to the higher-level section. As such, as a result of the constraints imposed on the movement of the management targets being relaxed, the efficiency of the work itself can be improved by increasing the degree of freedom in the arrangement of the management targets while the work is in progress.

Additionally, in the foregoing embodiment, the first wireless device (the target tag) which stores the first identification information for identifying a management target is attached to that management target, and the second wireless device (the position tag) which stores the second identification information associated with a corresponding installation section is installed in each section. Then, the section in which the management target is located is estimated based on a result of the first reading apparatus reading the identification information from the first wireless device and the second wireless device. In particular, reading the identification information from these wireless devices does not require communication with external apparatuses such as GPS satellites or wireless base stations. As such, even in environments where external communication is difficult, such as indoors, underground, or in tunnels, records for location estimation can be collected in a stable manner and used effectively to update the status and browse position information later.

Additionally, in the foregoing embodiment, the real space is regularly segmented into a plurality of coordinate regions, and coordinate region information regarding coordinate regions to which the positional coordinates estimated for the respective management targets belong is displayed by the display apparatus. According to this configuration, the user can easily and quickly understand an overview of the locations of the management targets at the latest point in time or at a point in time specified by the user. Additionally, by making it possible to display (in parallel or selectively) the coordinate region information and the located section information regarding located sections, the user's understanding of locations of the management targets can be supported even more effectively.

6. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-129380, filed on Aug. 15, 2022 which is hereby incorporated by reference herein in its entireties.

What is claimed is:

1. A process management system comprising:
   a management unit configured to manage section data that defines a plurality of sections set in a real space and process data that indicates an expected location, from among the plurality of sections, in which a management target is to be positioned at a time of completing a work process that involves a movement of the management target;
   a first wireless device that is attached to the management target and stores first identification information for identifying the management target;
   one or more second wireless devices each of which is installed in one of the plurality of sections and stores second identification information associated with the corresponding installation section:
   at least one reading apparatus that is capable of reading, from a wireless device, identification information stored in the wireless device;
   an estimation unit configured to estimate a location of the management target based on a result of reading of the first identification information from the first wireless device by a first reading apparatus and a result of reading of the second identification information from the second wireless device by the first reading apparatus; and
   a determination unit configured to check a location of the management target estimated by the estimation unit against the expected location to determine a status of the work process regarding the management target;
   wherein the section data defines at least one first-level section set in the real space with first spatial granularity and at least one second-level section set in the at least one first-level section with second spatial granularity that is finer than the first spatial granularity, and
   the determination unit is configured to check the location of the management target against the expected location by variable granularity depending on type information associated with the management target.

2. The process management system according to claim 1, wherein the type information includes a target type that indicates a type of the management target, and
   the determination unit is configured to: check a location of a first management target of which target type indicates a first type against the expected location by the first spatial granularity; and check a location of a second management target of which target type indicates a second type that is different from the first type against the expected location by the second spatial granularity.

3. The process management system according to claim 1, wherein the type information includes a process type that indicates a type of each of the plurality of work processes associated with the management target, and
   the determination unit is configured to: check a location of the management target against the expected location by the first spatial granularity in a case where the process type of a first work process out of the plurality of work processes indicates a first type; and check a location of the management target against the expected location by the second spatial granularity in a case where the process type of a second work process indicates a second type that is different from the first type.

4. The process management system according to claim 2, wherein the determination unit is configured to determine that a work process is completed regarding a management target of which type information indicates the first type in a case where a location of the management target is equal to a first-level section corresponding to the expected location indicated by the process data or to any lower-level section that belongs to the first-level section.

5. The process management system according to claim 3, wherein the second work process is a work process that follows the first work process.

6. The process management system according to claim 1, wherein the estimation unit is configured to estimate positional coordinates of the location of the management target based on an amount of movement of the first reading apparatus between a time point at which the first identification information has been read from the first wireless device by the first reading apparatus and a time point at which the second identification information has been read from the second wireless device by the first reading apparatus, and
   the determination unit is configured to check the location of the management target against the expected location by a level of positional coordinates in a case where the type information associated with the management target indicates a predetermined type.

7. The process management system according to claim 1, wherein the first-level section and the second-level section correspond to any two of a site, a building, a floor, and a room.

* * * * *